(12) United States Patent
Sugihara

(10) Patent No.: US 10,771,701 B2
(45) Date of Patent: Sep. 8, 2020

(54) BLUR DETECTION DEVICE, IMAGING DEVICE, LENS DEVICE, IMAGING DEVICE MAIN BODY, BLUR DETECTION METHOD, AND BLUR DETECTION PROGRAM

(71) Applicant: FUJIFILM Corporation, Tokyo (JP)

(72) Inventor: Yuki Sugihara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/700,941

(22) Filed: Dec. 2, 2019

(65) Prior Publication Data

US 2020/0106963 A1  Apr. 2, 2020

Related U.S. Application Data

(63) Continuation of application No. PCT/JP2018/020295, filed on May 28, 2018.

(30) Foreign Application Priority Data

Jun. 12, 2017 (JP) .................. 2017-115231

(51) Int. Cl.
*H04N 5/232* (2006.01)
*G03B 5/00* (2006.01)

(52) U.S. Cl.
CPC ........... *H04N 5/23287* (2013.01); *G03B 5/00* (2013.01); *H04N 5/23245* (2013.01); *H04N 5/23258* (2013.01)

(58) Field of Classification Search
None
See application file for complete search history.

(56) References Cited

U.S. PATENT DOCUMENTS 6,686,954 B1 * 2/2004 Kitaguchi ............ H04N 5/2253
                                                              348/208.1
2006/0038718 A1 * 2/2006 Arakane ............... G01C 21/165
                                                    342/357.32

(Continued)

FOREIGN PATENT DOCUMENTS

JP        H08-261761 A     10/1996
JP        2011-059403 A     3/2011

OTHER PUBLICATIONS

International Search Report issued in PCT/JP2018/020295; dated Jul. 17, 2018.

(Continued)

*Primary Examiner* — Twyler L Haskins
*Assistant Examiner* — Wesley J Chiu
(74) *Attorney, Agent, or Firm* — Studebaker & Brackett PC

(57) ABSTRACT

Provided are a blur detection device, an imaging device, a lens device, an imaging device main body, a blur detection method, and a blur detection program capable of appropriately detecting blurring of an imaging device. An angular velocity of a digital camera and a posture of the digital camera with respect to an Earth's rotation axis are detected. An Earth's rotation angular velocity component superimposed on a detection result of the angular velocity is calculated. The Earth's rotation angular velocity component is subtracted from the detection result of the angular velocity, and a blur amount of the digital camera is calculated based on the subtracted angular velocity.

18 Claims, 22 Drawing Sheets

(56) References Cited

U.S. PATENT DOCUMENTS

| | | | | |
|---|---|---|---|---|
| 2007/0003262 A1* | 1/2007 | Shiratori | ............ | H04N 5/23209 |
| | | | | 396/55 |
| 2009/0089001 A1* | 4/2009 | Lin | ........................ | G01C 21/16 |
| | | | | 702/92 |
| 2010/0254688 A1* | 10/2010 | Masuda | ................. | G03B 17/00 |
| | | | | 396/55 |
| 2011/0206236 A1* | 8/2011 | Center, Jr. | ............. | G06T 7/579 |
| | | | | 382/103 |
| 2012/0038783 A1* | 2/2012 | Noto | .................... | G02B 27/646 |
| | | | | 348/208.2 |
| 2012/0317825 A1* | 12/2012 | Ohta | ................. | G01R 33/0206 |
| | | | | 33/301 |
| 2016/0191820 A1* | 6/2016 | Iwasaki | ............. | H04N 5/35536 |
| | | | | 348/169 |
| 2017/0285365 A1* | 10/2017 | Wada | ........................ | G03B 5/00 |
| 2019/0360802 A1* | 11/2019 | Shimaji | ..................... | G01P 7/00 |

OTHER PUBLICATIONS

Written Opinion issued in PCT/JP2018/020295; dated Jul. 17, 2018.

\* cited by examiner

BLUR DETECTION DEVICE, IMAGING DEVICE, LENS DEVICE, IMAGING DEVICE MAIN BODY, BLUR DETECTION METHOD, AND BLUR DETECTION PROGRAM

CROSS-REFERENCE TO RELATED APPLICATIONS

The present application is a Continuation of PCT International Application No. PCT/JP2018/020295 filed on May 28, 2018 claiming priority under 35 U.S.C § 119(a) to Japanese Patent Application No. 2017-115231 filed on Jun. 12, 2017. Each of the above applications is hereby expressly incorporated by reference, in its entirety, into the present application.

BACKGROUND OF THE INVENTION

1. Field of the Invention

The present invention relates to a blur detection device, an imaging device, a lens device, an imaging device main body, a blur detection method, and a blur detection program.

2. Description of the Related Art

A technology of blur correction in an imaging device is established by combining a technology of detecting blurring with a technology of correcting the blurring.

An angular velocity sensor method has been known as one of the technology of detecting the blurring. In the angular velocity sensor method, an angular velocity of a shake caused in an imaging device is detected by an angular velocity sensor, and a blur amount is calculated by integrating an output thereof.

However, since the angular velocity sensor method is a method of detecting the angular velocity, there is a problem that this method is influenced by Earth's rotation. That is, the angular velocity due to the Earth's rotation is superimposed on an output of the angular velocity sensor, and thus, there is a problem that the blurring is detected even though the imaging device stops.

In the related art, the influence due to the Earth's rotation is eliminated by performing high pass filter processing on the output of the angular velocity sensor in the angular velocity sensor method. For example, in JP2011-059403A, a cutoff frequency is set such that a low frequency generated due to the Earth's rotation is cut, and high pass filter processing is performed on the output of the angular velocity sensor.

SUMMARY OF THE INVENTION

However, in a case where the high pass filter processing is performed on the output of the angular velocity so as not to be influenced by the Earth's rotation, the angular velocity slower than the Earth's rotation is not able to be detected, and thus, there is a disadvantage that blurring with a low frequency is not able to be detected. There is also an advantage that a limit exposure time at which performance of the blur correction is not able to be secured is shortened.

The present invention has been made in view of such circumstances, and an object thereof is to provide a blur detection device, an imaging device, a lens device, an imaging device main body, a blur detection method, and a blur detection program which are capable of appropriately detecting blurring of an imaging device.

Means for solving the problems are as follows.

(1) A blur detection device comprises an angular velocity detection unit that detects an angular velocity of an imaging device, a posture detection unit that detects a posture of the imaging device with respect to an Earth's rotation axis, a rotation angular velocity component calculation unit that calculates an Earth's rotation angular velocity component superimposed on an output of the angular velocity detection unit based on the posture of the imaging device detected by the posture detection unit, a subtraction unit that subtracts the rotation angular velocity component calculated by the rotation angular velocity component calculation unit from the output of the angular velocity detection unit, and a blur amount calculation unit that calculates a blur amount of the imaging device based on an output of the subtraction unit.

According to the present aspect, the angular velocity of the imaging device and the posture of the imaging device with the Earth's rotation axis are detected. The detection result of the angular velocity is given to the subtraction unit. The detection result of the posture is given to the rotation angular velocity component calculation unit. The rotation angular velocity component calculation unit calculates the Earth's rotation angular velocity component superimposed on the detection result of the angular velocity based on the detection result of the posture of the imaging device. The calculation result is given to the subtraction unit. The subtraction unit subtracts the Earth's rotation angular velocity component from the detection result of the angular velocity, and outputs the subtracted value. Accordingly, it is possible to separate the Earth's rotation angular velocity component from the detection result of the angular velocity using the angular velocity detection unit. The output of the subtraction unit is given to the blur amount calculation unit. The blur amount calculation unit calculates the blur amount of the imaging device based on the output of the subtraction unit. The output of the subtraction unit is an angular velocity of a true shake in which the influence due to the Earth's rotation is eliminated. Accordingly, it is possible to detect the blur amount acquired by eliminating the influence due to the Earth's rotation by detecting the blur amount based on the output thereof. Accordingly, it is possible to appropriately detect the blurring with the low frequency.

(2) The blur detection device according to (1) further comprises a high pass filter processing unit that performs high pass filter processing on the output of the subtraction unit, a cutoff frequency of the high pass filter processing unit being set to be a value lower than a frequency of blurring caused by Earth's rotation.

According to the present aspect, the high pass filter processing unit that performs the high pass filter processing on the output of the subtraction unit is further provided. The cutoff frequency of the high pass filter processing unit is set to be the value lower than the frequency of the blurring caused by the Earth's rotation. Accordingly, it is possible to eliminate the influence of a zero variation such as an offset error of the angular velocity detection unit or a trigger of an amplifier that amplifies the output of the angular velocity detection unit. As stated above, since the high pass filter processing is provided for the purpose of eliminating the influence of the zero variation of the output of the angular velocity detection unit, the cutoff frequency is set to be the value appropriate for the purpose, and is set to be as low as possible.

(3) The blur detection device according to (2) further comprises a switch unit that switches an output destination of the subtraction unit. The switch unit determines whether or not the output of the subtraction unit is equal to or less than a threshold value, sets the output destination of the subtraction unit to the blur amount calculation unit in a case where the output of the subtraction unit is equal to or less than the threshold value, and sets the output destination of the subtraction unit to the high pass filter processing unit in a case where the output of the subtraction unit exceeds the threshold value.

According to the present aspect, the switch unit that switches the output destination of the subtraction unit is further provided. The switch unit switches the output destination of the subtraction unit based on the so-called zero output. Specifically, it is determined whether or not the output of the subtraction unit is equal to or less than the threshold value, and the output destination of the subtraction unit is switched depending on the determination result. In a case where the output of the subtraction unit is equal to or less than the threshold value, the zero variation is deemed not to be present or to be negligibly small, and the output destination of the subtraction unit is set to the blur amount calculation unit. Accordingly, it is possible to appropriately detect the blurring with a lower frequency. Meanwhile, in a case where the output of the subtraction unit exceeds the threshold value, the zero variation is deemed to be large, and the output destination of the subtraction unit is set to the high pass filter processing unit. Accordingly, it is possible to appropriately eliminate the influence of the zero variation.

(4) The blur detection device according to (1) further comprises a first high pass filter processing unit that performs high pass filter processing on the output of the subtraction unit, a cutoff frequency of the first high pass filter processing unit being set to be a value higher than a frequency of blurring caused by Earth's rotation, a second high pass filter processing unit that performs high pass filter processing on the output of the subtraction unit, a cutoff frequency of the second high pass filter processing unit being set to be a value lower than the frequency of the blurring caused by the Earth's rotation, and a switch unit that switches an output destination of the subtraction unit to the first high pass filter processing unit or the second high pass filter processing unit based on an imaging condition.

According to the present aspect, the first high pass filter processing unit and the second high pass filter processing unit are provided as the processing unit that performs the high pass filter processing on the output of the subtraction unit. The cutoff frequency of the first high pass filter processing unit is set to be the value higher than the frequency of the blurring caused by the Earth's rotation, and the cutoff frequency of the second high pass filter processing unit is set to be the value smaller than the frequency of the blurring caused by the Earth's rotation. The output destination of the subtraction unit is switched by the switch unit. The switch unit switches the output destination of the subtraction unit to the first high pass filter processing unit or the second high pass filter processing unit based on the imaging condition such as the imaging mode.

(5) In the blur detection device according to (4), the switch unit determines whether or not an exposure time is equal to or less than a threshold value, sets the output destination of the subtraction unit to the first high pass filter processing unit in a case where the exposure time is equal to or less than the threshold value, and sets the output destination of the subtraction unit to the second high pass filter processing unit in a case where the exposure time exceeds the threshold value.

According to the present aspect, the output destination of the subtraction unit is switched based on the exposure time. Specifically, it is determined whether the exposure time is equal to or less than the threshold value, and the output destination of the subtraction unit is switched depending on the determination result. In a case where the exposure time is equal to or less than the threshold value, the exposure is deemed to be short-time exposure, and the output destination of the subtraction unit is set to the first high pass filter processing unit. In a case where the exposure time is the short time, the blurring with a low frequency is rarely influenced on the captured image. Accordingly, in this case, the first high pass filter processing unit of which the cutoff frequency is set to be high is used. Accordingly, it is possible to appropriately detect the blurring by efficiently removing a component as noise of the blur detection. Meanwhile, in a case where the exposure time exceeds the threshold value, the exposure is deemed to be the long-time exposure, and the output destination of the subtraction unit is set to the second high pass filter processing unit. In a case where the exposure time is the long time, the blurring with the low frequency is influenced on the captured image. Accordingly, in this case, the second high pass filter processing unit of which the cutoff frequency is set to be low is used. Accordingly, it is possible to appropriately detect the blurring with the low frequency.

(6) In the blur detection device according to (5), in a case where the exposure time exceeds the threshold value, the switch unit further determines whether or not the output of the subtraction unit is equal to or less than a threshold value, sets the output destination of the subtraction unit to the blur amount calculation unit in a case where the output of the subtraction unit is equal to or less than the threshold value, and sets the output destination of the subtraction unit to the second high pass filter processing unit in a case where the output of the subtraction unit exceeds the threshold value.

According to the present aspect, in a case where it is determined that the exposure time exceeds the threshold value, the next determination is further performed. That is, it is determined whether or not the output of the subtraction unit is equal to or less than the threshold value. As the determination result, in a case where the output of the subtraction unit is equal to or less than the threshold value, the output destination of the subtraction unit is set to the blur amount calculation unit. Meanwhile, in a case where the output of the subtraction unit exceeds the threshold value, the output destination of the subtraction unit is set to the second high pass filter processing unit. In a case where the output of the subtraction unit is equal to or less than the threshold value, the zero variation is deemed not to be present or to be negligibly small. Accordingly, in this case, the output destination of the subtraction unit is set to the blur amount calculation unit. Accordingly, it is possible to appropriately detect the blurring with a lower frequency. Meanwhile, in a case where the output of the subtraction unit exceeds the threshold value, since there is the zero variation, the output destination of the subtraction unit is set to the second high pass filter processing unit. Accordingly, it is possible to appropriately eliminate the influence of the zero variation.

(7) In the blur detection device according to (5) or (6), in a case where a time required for detecting blurring for a pixel pitch due to the Earth's rotation is a limit exposure time, the limit exposure time is set as the threshold value of the exposure time.

According to the present aspect, the limit exposure time is set as the threshold value of the exposure time. The limit exposure time is the time required for detecting the blurring for the pixel pitch due to the Earth's rotation. Accordingly, it is possible to appropriately detect the blurring with the low frequency by eliminating the influence due to the Earth's rotation.

(8) In the blur detection device according to (4), the switch unit determines whether or not a mode in which long-time exposure is performed is selected as an imaging mode, sets the output destination of the subtraction unit to the first high pass filter processing unit in a case where the mode in which the long-time exposure is performed is not selected, and sets the output destination of the subtraction unit to the second high pass filter processing unit in a case where the mode in which the long-time exposure is performed is selected.

According to the present aspect, the output destination of the subtraction unit is switched depending on the imaging mode. Specifically, it is determined whether or not the mode in which the long-time exposure is selected as the imaging mode, and the output destination of the subtraction unit is switched depending on the determination result thereof. Here, the mode in which the long-time exposure is performed is a mode in which the imaging is performed with a low shutter speed, and corresponds to, for example, a night view mode. In a case where the mode in which the long-time exposure is performed is not selected, the exposure is deemed to be the short-time exposure, and the output destination of the subtraction unit is set to the first high pass filter processing unit. In a case where the exposure time is the short time, the blurring with a low frequency is rarely influenced on the captured image. Accordingly, in this case, the first high pass filter processing unit of which the cutoff frequency is set to be high is used. Accordingly, it is possible to appropriately detect the blurring necessary for the correction. Meanwhile, in a case where the mode in which the long-time exposure is performed is selected, the exposure is deemed to be the long-time exposure, and the output destination of the subtraction unit is set to the second high pass filter processing unit. In a case where the exposure time is the long time, the blurring with the low frequency is influenced on the captured image. Accordingly, in this case, the second high pass filter processing unit of which the cutoff frequency is set to be low is used. Accordingly, it is possible to appropriately detect the blurring with the low frequency.

(9) In the blur detection device according to (8), in a case where the mode in which the long-time exposure is performed is selected, the switch unit further determines whether or not the output of the subtraction unit is equal to or less than a threshold value, and sets the output destination of the subtraction unit to the blur amount calculation unit in a case where the output of the subtraction unit is equal to or less than the threshold value, and sets the output destination of the subtraction unit to the second high pass filter processing unit in a case where the output of the subtraction unit exceeds the threshold value.

According to the present aspect, in a case where it is determined that the mode in which the long-time exposure is performed is selected, the next determination is further performed. That is, it is determined whether or not the output of the subtraction unit is equal to or less than the threshold value. As the determination result, in a case where the output of the subtraction unit is equal to or less than the threshold value, the output destination of the subtraction unit is set to the blur amount calculation unit. Meanwhile, in a case where the output of the subtraction unit exceeds the threshold value, the output destination of the subtraction unit is set to the second high pass filter processing unit. In a case where the output of the subtraction unit is equal to or less than the threshold value, the zero variation is deemed not to be present or to be negligibly small. Accordingly, in this case, the output destination of the subtraction unit is set to the blur amount calculation unit. Accordingly, it is possible to appropriately detect the blurring with a lower frequency. Meanwhile, in a case where the output of the subtraction unit exceeds the threshold value, since there is the zero variation, the output destination of the subtraction unit is set to the second high pass filter processing unit. Accordingly, it is possible to appropriately eliminate the influence of the zero variation.

(10) The blur detection device according to (1) further comprises a first high pass filter processing unit that performs high pass filter processing on an output of the subtraction unit, a cutoff frequency of the first high pass filter processing unit being set to be a value higher than a frequency of blurring caused by Earth's rotation, a second high pass filter processing unit that performs high pass filter processing on the output of the subtraction unit, a cutoff frequency of the second high pass filter processing unit being set to be a value lower than the frequency of the blurring caused by the Earth's rotation, and a setting unit that sets an output destination of the subtraction unit to the first high pass filter processing unit or the second high pass filter processing unit.

According to the present aspect, the first high pass filter processing unit and the second high pass filter processing unit are provided as the processing unit that performs the high pass filter processing on the output of the subtraction unit. The cutoff frequency of the first high pass filter processing unit is set to be the value higher than the frequency of the blurring caused by the Earth's rotation, and the cutoff frequency of the second high pass filter processing unit is set to be the value smaller than the frequency of the blurring caused by the Earth's rotation. The output destination of the subtraction unit is set by the setting unit. The setting unit sets the output destination of the subtraction unit depending on the setting by the user, the set imaging mode, and the exposure time.

(11) The blur detection device according to (10) further comprises an automatic switch unit that determines whether or not the output of the subtraction unit is equal to or less than a threshold value in a case where the output destination of the subtraction unit is set to the second high pass filter processing unit, and switches the output destination of the subtraction unit to the blur amount calculation unit in a case where the output of the subtraction unit is equal to or less than the threshold value.

According to the present aspect, in a case where the output destination of the subtraction unit is set to the second high pass filter processing unit, the output destination of the subtraction unit is automatically switched depending on the output of the subtraction unit. The switching is performed by the automatic switch unit. The automatic switch unit determines whether or not the output of the subtraction unit is equal to or less than the threshold value, and switches the output destination of the subtraction unit to the blur amount calculation unit based on the determination result thereof. Specifically, in a case where the output of the subtraction unit is equal to or less than the threshold value, the output destination of the subtraction unit is switched to the blur amount calculation unit. In a case where the output of the subtraction unit is equal to or less than the threshold value, the zero variation is deemed not to be present or to be negligibly small. Accordingly, in this case, the output destination of the subtraction unit is set to the blur amount calculation unit. Accordingly, it is possible to appropriately detect the blurring with a lower frequency.

(12) An imaging device comprises an imaging optical system comprising a blur correction lens, and a blur correction mechanism that corrects blurring by moving the blur correction lens, an image sensor that receives light passing through the imaging optical system to capture an image, the blur detection device according to any one of (1) to (11), a blur correction amount calculation unit that calculates a blur correction amount based on a blur amount detected by the blur detection device, and a blur correction controller that controls driving of the blur correction mechanism based on the correction amount calculated by the blur correction amount calculation unit.

According to the present aspect, the blurring is corrected by the blur correction lens provided at the imaging optical system. The blur correction amount is calculated based on the blur amount detected by the blur detection device.

(13) An imaging device comprises an imaging optical system, an image sensor that receives light passing through the imaging optical system to capture an image, a blur correction mechanism that corrects blurring by moving the image sensor, the blur detection device according to any one of (1) to (11), a blur correction amount calculation unit that calculates a blur correction amount based on a blur amount detected by the blur detection device, and a blur correction controller that controls driving of the blur correction mechanism based on the correction amount calculated by the blur correction amount calculation unit.

According to the present aspect, the blurring is corrected by moving the image sensor (so-called image sensor shift method). The blur correction amount is calculated based on the blur amount detected by the blur detection device.

(14) A lens device attachable and detachable to and from an imaging device main body comprises the blur detection device according to any one of (1) to (11).

According to the present aspect, the blur detection device is provided at the lens device of the so-called imaging device with the interchangeable lens.

(15) The lens device according to (14) further comprises a blur correction lens, a blur correction mechanism that corrects blurring by moving the blur correction lens, a blur correction amount calculation unit that calculates a blur correction amount based on a blur amount detected by the blur detection device, and a blur correction controller that controls driving of the blur correction mechanism based on the correction amount calculated by the blur correction amount calculation unit.

According to the present aspect, the blur correction lens, the blur correction mechanism, the blur correction amount calculation unit, and the blur correction controller are provided in the lens device.

(16) An imaging device main body to and from which a lens device is attachable and detachable comprises an image sensor that receives light passing through the lens device to capture an image, and the blur detection device according to any one of (1) to (11).

According to the present aspect, the blur detection device is provided at the imaging device main body of the so-called imaging device with the interchangeable lens.

(17) The imaging device main body according to (16) further comprises a blur correction mechanism that corrects blurring by moving the image sensor, a blur correction amount calculation unit that calculates a blur correction amount based on a blur amount detected by the blur detection device, and a blur correction controller that controls driving of the blur correction mechanism based on the correction amount calculated by the blur correction amount calculation unit.

According to the present aspect, the blur correction mechanism, the blur correction amount calculation unit, and the blur correction controller are provided at the imaging device main body.

(18) A blur detection method comprises detecting an angular velocity of an imaging device, a step of detecting a posture of the imaging device with respect to an Earth's rotation axis, a step of calculating an Earth's rotation angular velocity component superimposed on a detection result of the angular velocity of the imaging device based on the detected posture of the imaging device, a step of subtracting the calculated rotation angular velocity component from the detection result of the angular velocity of the imaging device, and a step of calculating a blur amount of the imaging device based on the subtracted detection result of the angular velocity of the imaging device.

According to the present aspect, the blur amount is calculated by removing the Earth's rotation angular velocity component from the detection result of the angular velocity of the imaging device. Accordingly, it is possible to detect the blurring without being influenced by the Earth's rotation. It is possible to appropriately detect the blurring with the low frequency.

(19) A blur detection program causing a computer to execute a function of receiving an output from an angular velocity detection unit that detects an angular velocity of an imaging device, a function of receiving an output of a posture detection unit that detects a posture of the imaging device with respect to an Earth's rotation axis, a function of calculating an Earth's rotation angular velocity component superimposed on the output of the angular velocity detection unit based on the posture of the imaging device detected by the posture detection unit, a function of subtracting the calculated rotation angular velocity component from the output of the angular velocity detection unit, and a function of calculating a blur amount of the imaging device based on the subtracted output of the angular velocity detection unit.

According to the present aspect, the blur amount is calculated by removing the Earth's rotation angular velocity component from the output of the angular velocity detection unit. Accordingly, it is possible to detect the blurring without being influenced by the Earth's rotation. It is possible to appropriately detect the blurring with the low frequency.

Accordingly, it is possible to appropriately detect the blurring of the imaging device.

DESCRIPTION OF THE PREFERRED EMBODIMENTS

Hereinafter, preferred embodiments for implementing the present invention will be described with reference to the accompanying drawings.

First Embodiment

[Configuration of Digital Camera]

Figure 1:
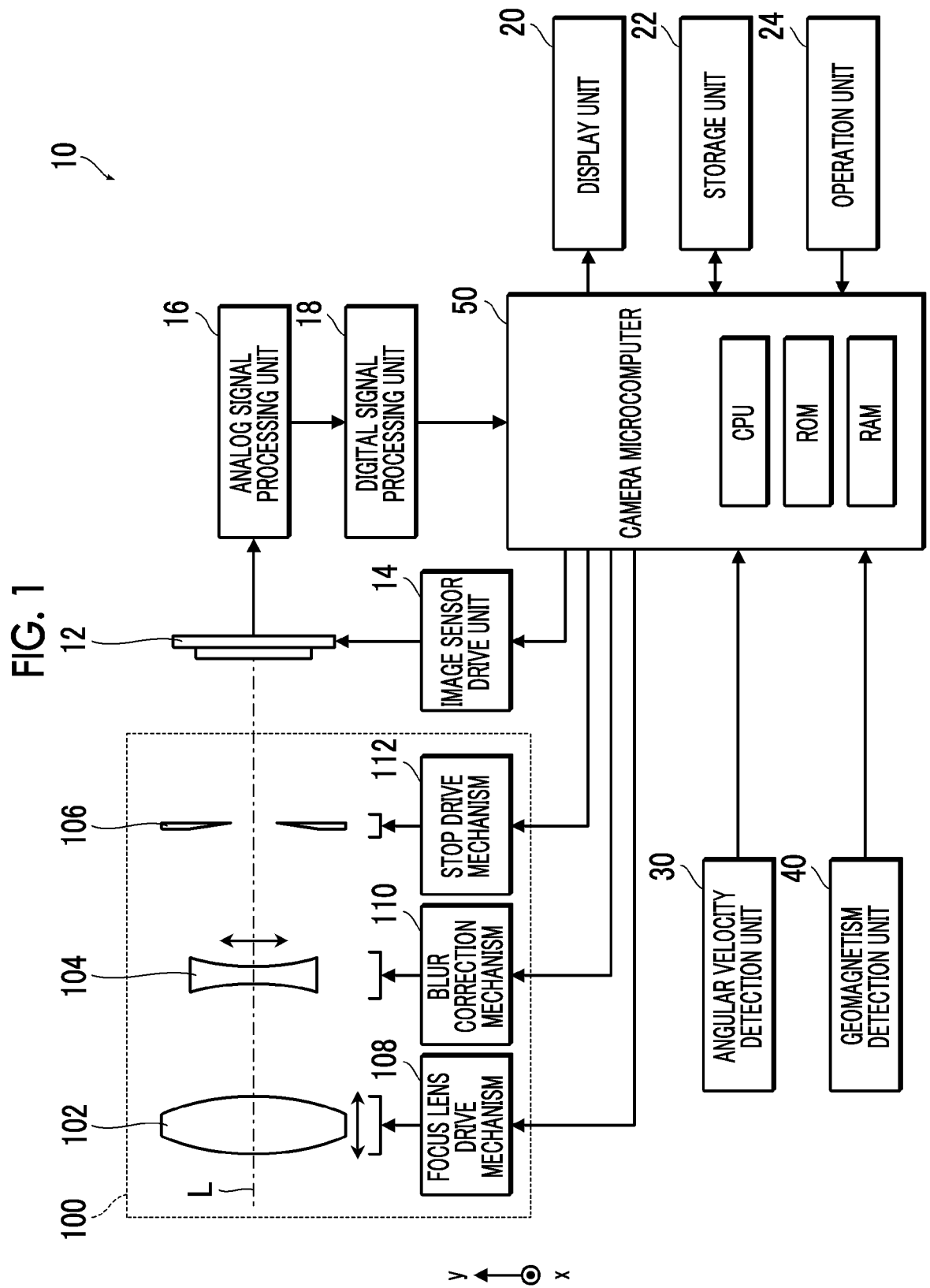
FIG. 1 is a block diagram showing a schematic configuration of a digital camera.

FIG. 1 is a block diagram showing a schematic configuration of a digital camera.

A digital camera 10 is an example of an imaging device. As illustrated in this drawing, the digital camera 10 comprises an imaging optical system 100, an image sensor 12, an image sensor drive unit 14, an analog signal processing unit 16, a digital signal processing unit 18, a display unit 20, a storage unit 22, an operation unit 24, an angular velocity detection unit 30, a geomagnetism detection unit 40, and a camera microcomputer 50.

<<Imaging Optical System>>

The imaging optical system 100 comprises a plurality of lenses that includes a focus lens 102 and a blur correction lens 104. FIG. 1 shows only the focus lens 102 and the blur correction lens 104. A stop 106 is included on an optical path in the imaging optical system 100.

<Focus Lens>

The focus lens 102 is a lens for focus adjustment, and is provided along an optical axis L so as to be movable back and forth. A focus lens drive mechanism 108 for moving the focus lens 102 along the optical axis L back and forth is included in the imaging optical system 100. The focus lens drive mechanism 108 comprises a linear motor as an actuator and a drive circuit thereof. The focus lens drive mechanism 108 drives the linear motor according to a command from the camera microcomputer 50, and moves the focus lens 102 along the optical axis L.

<Blur Correction Lens>

The blur correction lens 104 is a lens for blur correction, and is provided so as to be movable in two directions perpendicular within a plane perpendicular to the optical axis L.

Figure 2:
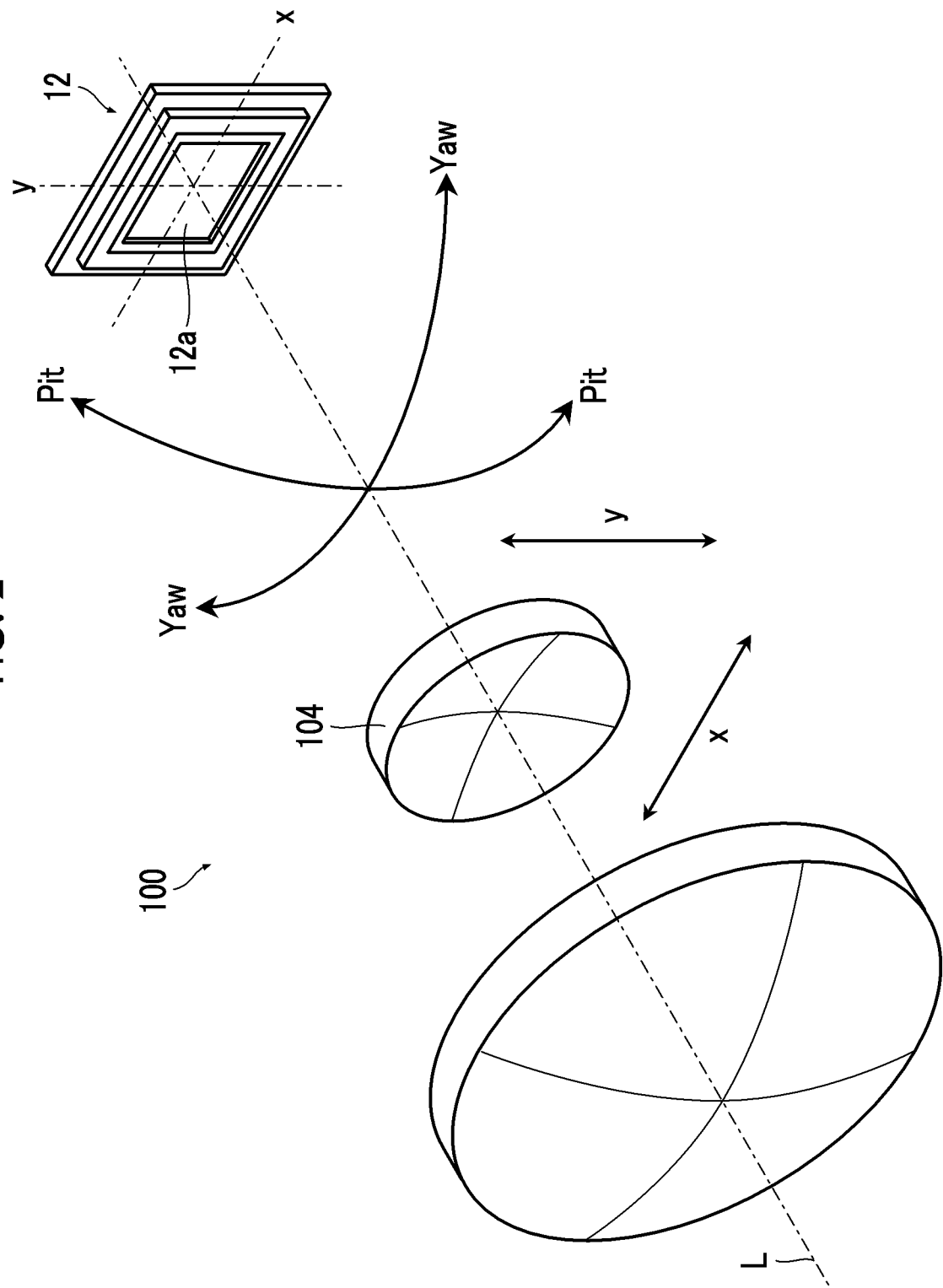
FIG. 2 is a conceptual diagram of movement of a blur correction lens.

FIG. 2 is a conceptual diagram of the movement of the blur correction lens.

As shown in this drawing, the blur correction lens 104 is provided so as to be movable in the directions of an x-axis and a y-axis. The x-axis and the y-axis pass through a center of the image sensor 12, and are set as axes perpendicular to the optical axis L. The x-axis direction is a horizontal direction (left-right direction) of the digital camera 10, and the y-axis direction is a vertical direction (up-down direction) of the digital camera 10.

In a case where blur is corrected, the blur correction lens 104 is moved in a direction in which the blur is canceled. A blur correction mechanism 110 that moves the blur correction lens 104 in the x-axis and y-axis directions to correct the blur is included in the imaging optical system 100.

Figure 3:
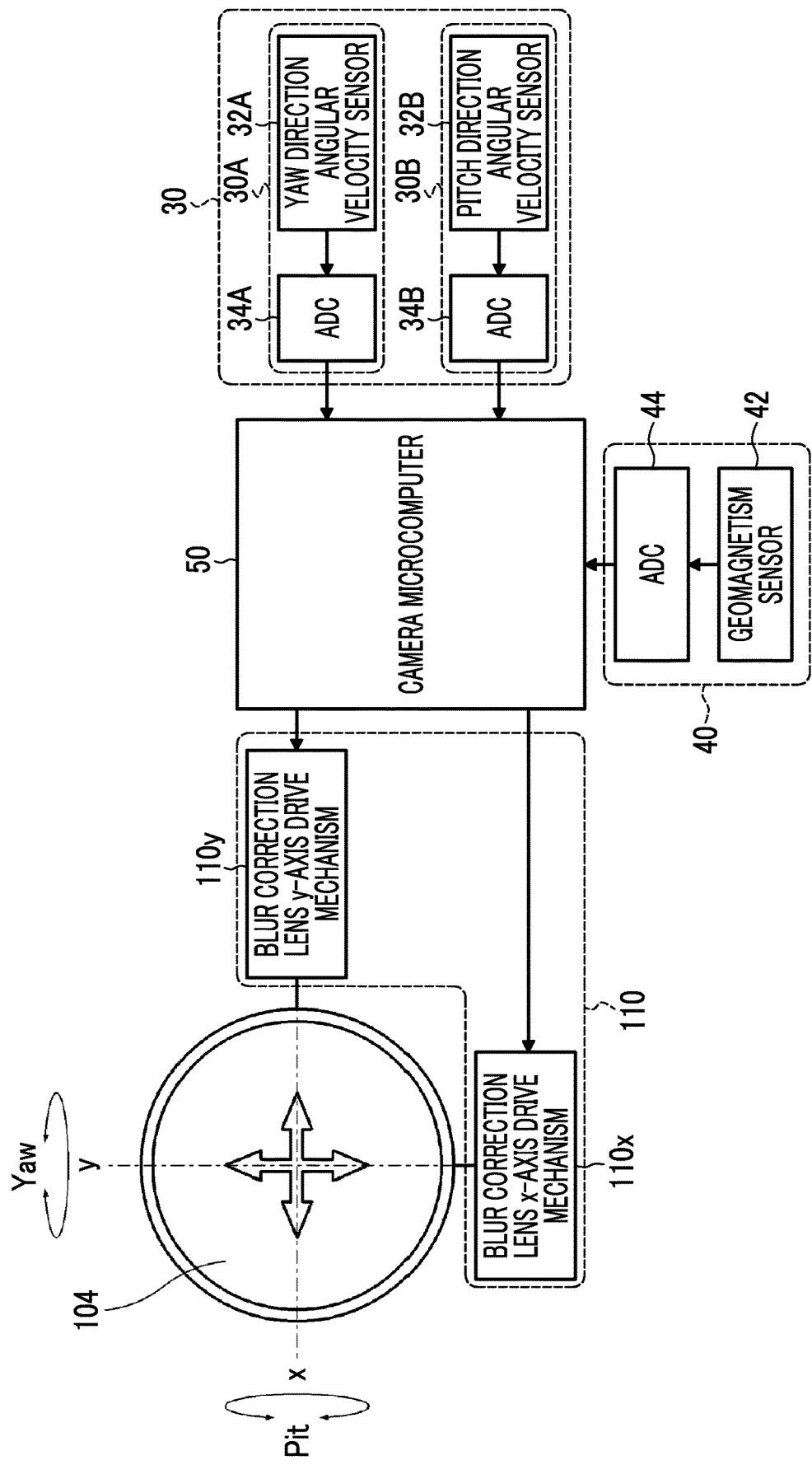
FIG. 3 is a diagram showing a schematic configuration of a blur correction mechanism.

FIG. 3 is a diagram showing a schematic configuration of the blur correction mechanism.

The blur correction mechanism 110 comprises a blur correction lens x-axis drive mechanism 110x and a blur correction lens v-axis drive mechanism 110y.

The blur correction lens x-axis drive mechanism 110x is a mechanism for moving the blur correction lens 104 in the x-axis direction. The blur correction lens x-axis drive mechanism 110x comprises a linear motor (for example, a voice coil motor) as an actuator and a drive circuit thereof. The blur correction lens x-axis drive mechanism 110x drives the linear motor according to a command from the camera microcomputer 50, and moves the blur correction lens 104 in the x-axis direction.

The blur correction lens y-axis drive mechanism 110y is a mechanism for moving the blur correction lens 104 in the y-axis direction. The blur correction lens y-axis drive mechanism 110y comprises a linear motor (for example, voice coil motor) as an actuator and a drive circuit thereof. The blur correction lens y-axis drive mechanism 110y drives a linear motor according to a command from the camera microcomputer 50, and moves the blur correction lens 104 in the y-axis direction.

<Stop>

The stop 106 adjusts the amount of light (light amount) passing through the imaging optical system 100 by adjusting an opening amount thereof. For example, the stop 106 is an iris diaphragm, and adjusts the opening amount by scaling a stop leaf blade. A stop drive mechanism 112 for driving the stop 106 is included in the imaging optical system 100. The stop drive mechanism 112 comprises a motor as an actuator and a drive circuit thereof. The stop drive mechanism 112 drives the motor according to a command from the camera microcomputer 50, and adjusts the opening amount by scaling the leaf blades of the stop 106.

<<Image Sensor>>

The image sensor 12 receives the light passing through the imaging optical system 100 to capture an image. The image sensor 12 is a known image sensor such as a complementary metal-oxide semiconductor (CMOS) type, a charge coupled device (CCD) type, and is an area image sensor in which a plurality of pixels is two-dimensionally arranged.

<<Image Sensor Drive Unit>>

The image sensor drive unit 14 drives the image sensor 12 according to a command from the camera microcomputer 50. The image sensor 12 is driven by the image sensor drive unit 14, and thus, electric charges accumulated in the pixels are read out as image signals.

<<Analog Signal Processing Unit>>

The analog signal processing unit 16 receives an analog image signal for each pixel output from the image sensor 12, and performs predetermined signal processing (for example, sampling two correlation pile and amplification processing). The analog signal processing unit 16 includes an analog-to-digital converter (AD converter (ADC)), converts the analog image signal after the predetermined signal processing into a digital image signal, and outputs the converted image signal.

<<Digital Signal Processing Unit>>

The digital signal processing unit 18 receives the digital image signal output from the analog signal processing unit 16, and generates image data by performing predetermined signal processing (for example, gradation transformation processing, white balance correction processing, gamma-correction processing, demosaicing processing, and YC conversion processing). The generated image data is output to the camera microcomputer 50.

The digital signal processing unit 18 detects information of brightness of a subject necessary for exposure control based on the received image signal. The detected information of the brightness of the subject is output to the camera microcomputer 50.

The digital signal processing unit 18 detects information of contrast of the subject necessary for autofocus control based on the received image signal. The detected information of the contrast is output to the camera microcomputer 50.

<<Display Unit>>

The display unit 20 displays various information including the image. The display unit 20 comprises a display device such as a liquid crystal display or an organic electroluminescent (EL) and a drive circuit thereof. A live view is displayed on the display unit 20 in addition to a captured image. The live view is a function of displaying an image captured by the image sensor in real time. It is possible to image the image while confirming the image on the display unit 20 by displaying the live view. The display unit 20 is used as a display screen for a user interface at the time of performing various settings. The display on the display unit 20 is controlled by the camera microcomputer 50.

<<Storage Unit>>

The storage unit 22 stores various data including the image data. The storage unit 22 comprises a built-in memory, and a control circuit that writes data in the built-in memory. For example, the built-in memory is a nonvolatile memory such as electrically erasable programmable read only memory (EEPROM). The writing of the data in the storage unit 22 is controlled by the camera microcomputer 50.

The storage unit 22 can be an external memory such as a so-called memory card. In this case, a card slot for loading a memory card is included in the digital camera 10.

<<Operation Unit>>

The operation unit 24 includes general operation means of the digital camera such as a release button, a power switch, an imaging mode dial, a shutter speed dial, an exposure correction dial, a command dial, a menu button, a cross key, an OK button, a cancel button, a delete button, and a blur correction switch, and outputs a signal corresponding to the operation to the camera microcomputer 50.

Here, the blur correction switch is a switch for turning on and off a blur correction function. In a case where the blur correction switch is turned on, the blur correction function is turned on, and in a case where the blur correction switch is turned off, the blur correction function is turned off.

The imaging mode dial is a dial for setting an imaging mode. The imaging mode is set to a portrait mode, a scenery mode, and a night view mode by the imaging mode dial. The portrait mode is an imaging mode in which imaging control appropriate for portrait imaging is performed. The scenery mode is an imaging mode in which imaging control appropriate for scenery imaging is performed. The night view mode is an imaging mode in which imaging control appropriate for night view imaging is performed. In the night view mode, imaging in which a shutter speed is decreased is performed. In addition, imaging modes such as a shutter speed priority mode, a stop priority mode, and a manual mode are set by the imaging mode dial.

<<Angular Velocity Detection Unit>>

The angular velocity detection unit 30 detects angular velocities in a yaw direction Yaw and a pitch direction Pit of the digital camera 10. As shown in FIG. 3, the angular velocity detection unit 30 comprises a yaw direction angular velocity detection unit 30A and a pitch direction angular velocity detection unit 30B.

The yaw direction angular velocity detection unit 30A detects the angular velocity in the yaw direction Yaw of the digital camera 10. The yaw direction Yaw is a rotation direction around the y-axis, and is a rotation direction of the horizontal direction of the digital camera 10 (see FIG. 2). The yaw direction angular velocity detection unit 30A comprises a yaw direction angular velocity sensor 32A that detects the angular velocity in the yaw direction Yaw of the digital camera 10 and an AD converter (ADC) 34A that converts an output of the yaw direction angular velocity detection unit 30A into a digital signal. The output of the yaw direction angular velocity detection unit 30A is converted into the digital signal in the ADC 34A, and is output to the camera microcomputer 50.

The pitch direction angular velocity detection unit 30B detects the angular velocity in the pitch direction Pit of the digital camera 10. The pitch direction Pit is a rotation direction around the x-axis, and is a rotation direction of the vertical direction of the digital camera 10 (see FIG. 2). The pitch direction angular velocity detection unit 30B comprises a pitch direction angular velocity sensor 32B that detects the angular velocity in the pitch direction Pit of the digital camera 10 and an AD converter (ADC) 34B that converts an output of the pitch direction angular velocity detection unit 30B into a digital signal. The output of the pitch direction angular velocity detection unit 30B is converted into the digital signal in the ADC 34B, and is output to the camera microcomputer 50.

<<Geomagnetism Detection Unit>>

The geomagnetism detection unit 40 detects geomagnetism. As shown in FIG. 3, the geomagnetism detection unit 40 comprises a geomagnetism sensor 42 and an AD converter (ADC) 44 that converts an output of the geomagnetism sensor 42 into a digital signal. The output of the geomagnetism sensor 42 is converted into the digital signal in the ADC 44, and is output to the camera microcomputer 50. The camera microcomputer 50 detects a posture of the digital camera 10 with respect to an Earth's rotation axis based on a detection result of the geomagnetism detection unit 40. The detection of the posture of the digital camera will be described below.

<<Camera Microcomputer>>

The camera microcomputer 50 functions as a controller that generally controls the entire operation of the digital camera 10. The camera microcomputer 50 functions as a calculation processing unit that calculates a physical amount necessary for control of the digital camera 10. The camera microcomputer 50 is a computer (microcomputer) that comprises a central processing unit (CPU), a random access memory (RAM), and a read only memory (ROM). The camera microcomputer 50 realizes various functions by executing predetermined programs such as a focus control program, an exposure control program, and a blur detection program. The program executed by the camera microcomputer 50 and various data necessary for the control are stored in the ROM (non-transitory computer-readable recording medium).

Figure 4:
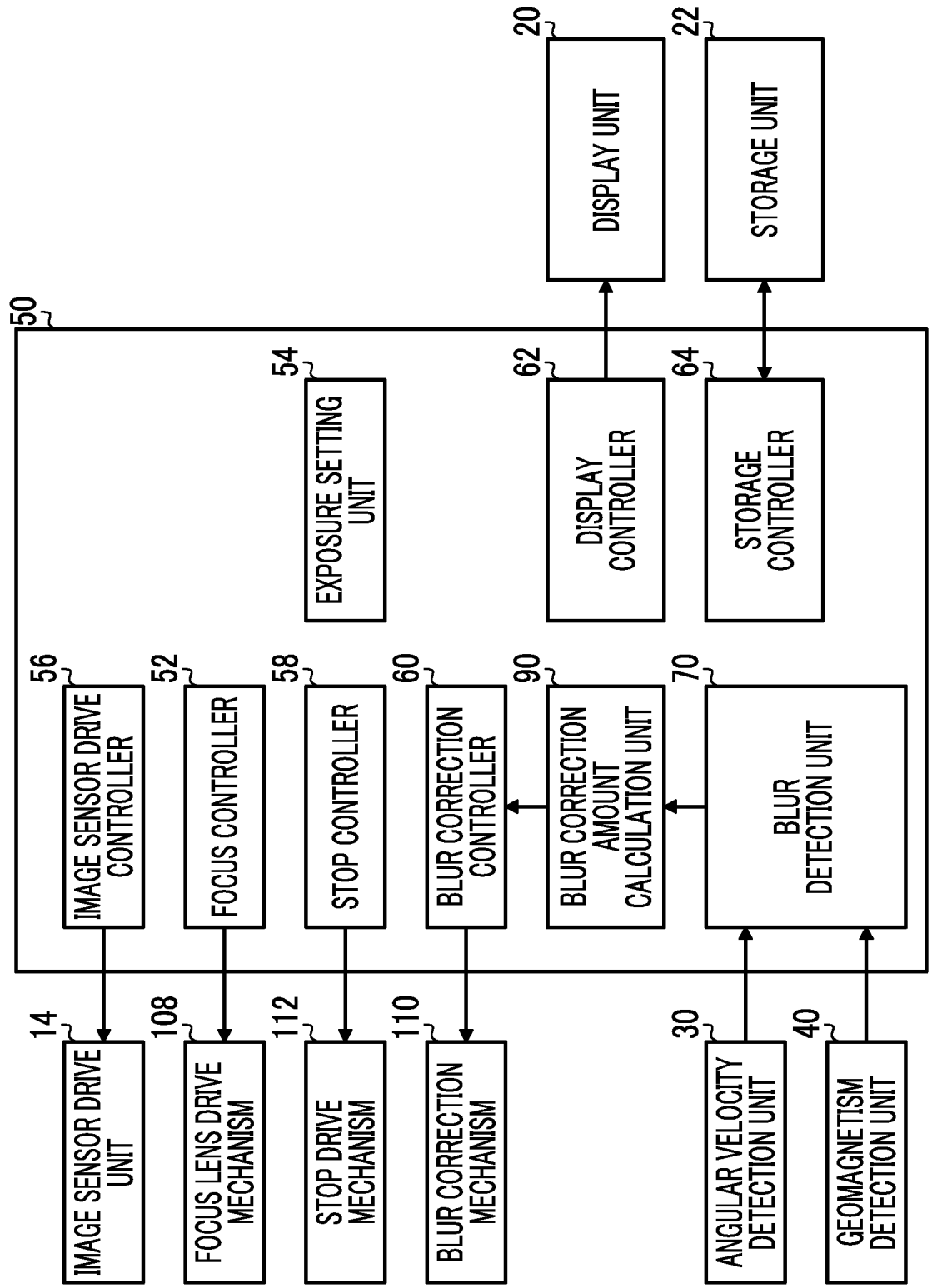
FIG. 4 is a block diagram of main functions realized by a camera microcomputer.

FIG. 4 is a block diagram of main functions realized by the camera microcomputer.

As shown in this drawing, the camera microcomputer 50 functions as a focus controller 52, an exposure setting unit 54, an image sensor drive controller 56, a stop controller 58, a blur correction controller 60, a display controller 62, a storage controller 64, a blur detection unit 70, and a blur correction amount calculation unit 90.

<Focus Controller>

The focus controller 52 performs so-called contrast type autofocus control. That is, the focus lens 102 is moved to an infinity end from the closest end to detect a position at which contrast is maximized, and moves the focus lens 102 to the detected position.

<Exposure Setting Unit>

The exposure setting unit 54 sets a shutter speed (exposure time) and an F number with which optimum exposure is performed based on the detection result of the brightness of the subject.

<Image Sensor Drive Controller>

The image sensor drive controller 56 controls the driving of the image sensor 12 through the image sensor drive unit 14 such that the exposure is performed with the shutter speed set by the exposure setting unit 54.

<Stop Controller>

The stop controller 58 controls the stop 106 through the stop drive mechanism 112 such that the F number set in the exposure setting unit 54 is acquired.

<Blur Correction Controller>

The blur correction controller 60 controls the driving of the blur correction mechanism 110 to correct blurring based on information of a blur correction amount of calculated by a blur correction amount calculation unit 90.

<Display Controller>

The display controller 62 controls the display of the display unit 20. For example, in a case where image data acquired through the imaging is displayed on the display unit 20, the image data is converted to a data format capable of being displayed on the display unit 20, and is output to the display unit 20.

<Storage Controller>

The storage controller 64 controls the writing of the data in the storage unit 22. The image data acquired through the imaging is stored in the storage unit 22 through the storage controller 64. In a case where the image data stored in the storage unit 22 is played, the image data is read out from the storage unit 22 through the storage controller 64.

<Blur Detection Unit>

The blur detection unit 70 calculates the blur amount of the digital camera 10 based on the detection results of the angular velocity detection unit 30 and the posture detection unit.

Figure 5:
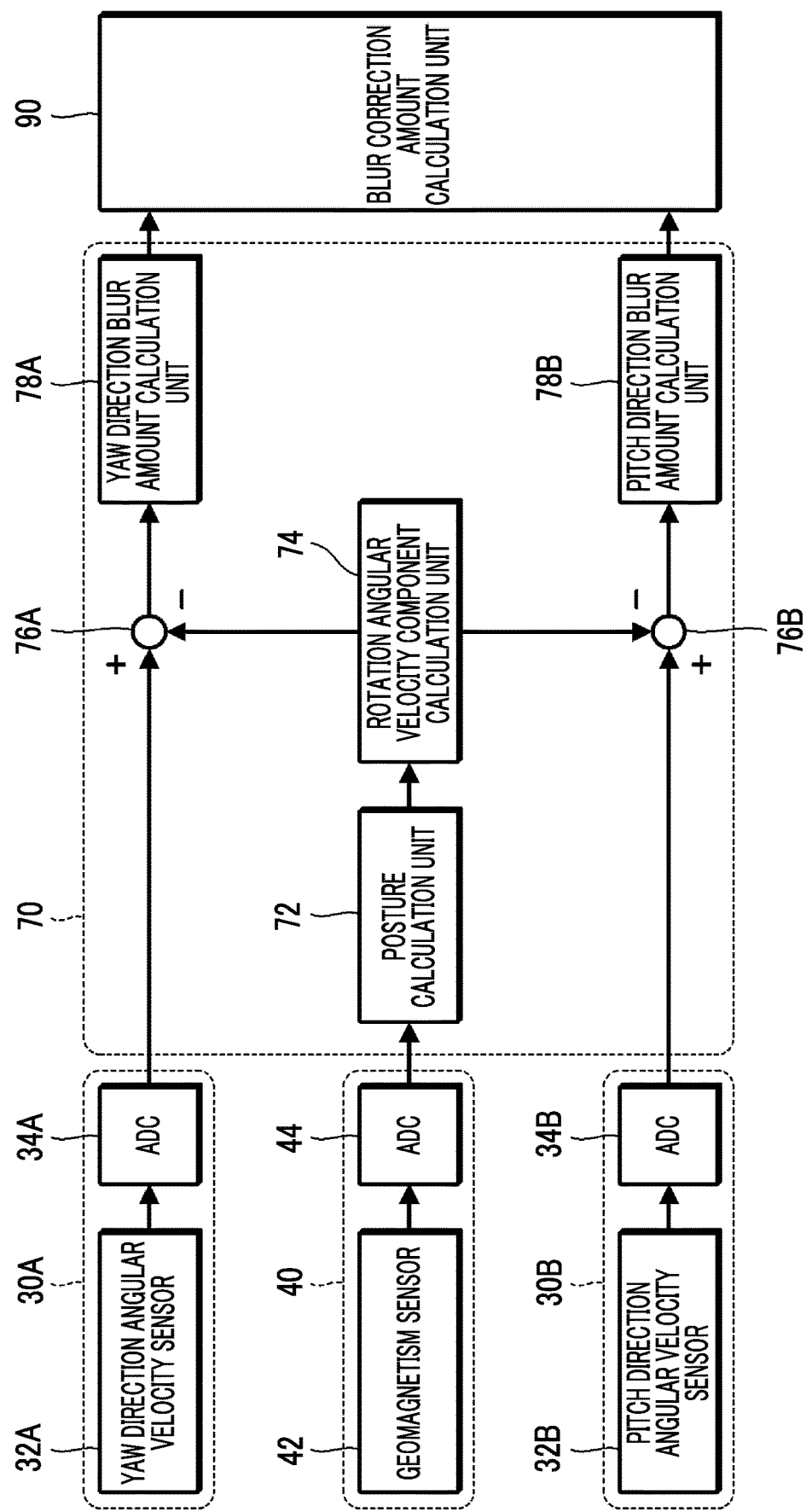
FIG. 5 is a block diagram showing a configuration of a blur detection unit.

FIG. 5 is a block diagram showing a configuration of the blur detection unit.

The blur detection unit 70 comprises a posture calculation unit 72, a rotation angular velocity component calculation unit 74, a yaw direction subtraction unit 76A, a pitch direction subtraction unit 76B, a yaw direction blur amount calculation unit 78A, and a pitch direction blur amount calculation unit 78B.

[Posture Calculation Unit]

The posture calculation unit 72 calculates the posture of the digital camera 10 with respect to the Earth's rotation axis based on the output of the geomagnetism detection unit 40. The posture of the digital camera 10 is calculated as a posture of the image sensor 12 with respect to the Earth's rotation axis, more specifically, as postures on the x-axis and the y-axis of the image sensor 12 with respect to the Earth's rotation axis. The calculation result is output to the rotation angular velocity component calculation unit 74.

In the digital camera 10 according to the present embodiment, the posture calculation unit 72 and the geomagnetism detection unit 40 constitute a posture detection unit.

[Rotation Angular Velocity Component Calculation Unit]

The rotation angular velocity component calculation unit 74 calculates an Earth's rotation angular velocity component superimposed on the output of the angular velocity detection unit 30 based on the posture of the digital camera 10 with respect to the Earth's rotation axis calculated by the posture calculation unit 72.

As stated above, the angular velocity detection unit 30 detects the angular velocities in the yaw direction Yaw and the pitch direction Pit by the yaw direction angular velocity detection unit 30A and the pitch direction angular velocity detection unit 30B. Accordingly, the rotation angular velocity component calculation unit 74 calculates the Earth's rotation angular velocity component superimposed on the output of the yaw direction angular velocity detection unit 30A and the Earth's rotation angular velocity component superimposed on the output of the pitch direction angular velocity detection unit 30B.

An Earth's rotation angular velocity $\omega$ is known, and $\omega \approx 7.292 \times 10^{-5}$ [rad/second]. The rotation angular velocity component calculation unit 74 calculates the Earth's rotation angular velocity component superimposed on the output of the yaw direction angular velocity detection unit 30A and the Earth's rotation angular velocity component superimposed on the output of the pitch direction angular velocity detection unit 30B based on information of the known Earth's rotation angular velocity $\omega$.

The calculation results are output to the yaw direction subtraction unit 76A and the pitch direction subtraction unit 76B. That is, the calculation result of the Earth's rotation angular velocity component superimposed on the output of the yaw direction angular velocity detection unit 30A is output to the yaw direction subtraction unit 76A. The calculation result of the Earth's rotation angular velocity component superimposed on the output of the pitch direction angular velocity detection unit 30B is output to the pitch direction subtraction unit 76B.

[Yaw Direction Subtraction Unit]

The yaw direction subtraction unit 76A performs subtraction processing on the output of the yaw direction angular velocity detection unit 30A based on the calculation result of the rotation angular velocity component calculation unit 74. Specifically, the rotation angular velocity component in the yaw direction calculated by the rotation angular velocity component calculation unit 74 is subtracted from the output of the yaw direction angular velocity detection unit 30A. Accordingly, it is possible to remove the Earth's rotation angular velocity component from the angular velocity in the yaw direction Yaw detected by the yaw direction angular velocity detection unit 30A. The processing result of the yaw direction subtraction unit 76A is output to the yaw direction blur amount calculation unit 78A.

[Pitch Direction Subtraction Unit]

The pitch direction subtraction unit 76B performs subtraction processing on the output of the pitch direction angular velocity detection unit 30B based on the calculation result of the rotation angular velocity component calculation unit 74. Specifically, the rotation angular velocity component in the pitch direction calculated by the rotation angular velocity component calculation unit 74 is subtracted from the output of the pitch direction angular velocity detection unit 30B. Accordingly, it is possible to remove the Earth's rotation angular velocity component from the angular velocity in the pitch direction Pit detected by the pitch direction angular velocity detection unit 30B. The processing result of the pitch direction subtraction unit 76B is output to the pitch direction blur amount calculation unit 78B.

[Yaw Direction Blur Amount Calculation Unit]

The yaw direction blur amount calculation unit 78A calculates a blur amount in the yaw direction Yaw of the digital camera 10 based on the output of the yaw direction subtraction unit 76A. Specifically, the blur amount in the yaw direction Yaw is calculated by integrating an angular velocity signal in the yaw direction Yaw after the subtraction processing output from the yaw direction subtraction unit 76A. The processing result of the yaw direction blur amount calculation unit 78A is output to the blur correction amount calculation unit 90.

[Pitch Direction Blur Amount Calculation Unit]

The pitch direction blur amount calculation unit 78B calculates a blur amount in the pitch direction Pit of the digital camera 10 based on the output of the pitch direction subtraction unit 76B. Specifically, the blur amount in the pitch direction Pit is calculated by integrating an angular velocity signal in the pitch direction Pit after the subtraction processing output from the pitch direction subtraction unit 76B. The processing result of the pitch direction blur amount calculation unit 78B is output to the blur correction amount calculation unit 90.

As stated above, the blur detection unit 70 calculates the blur amount of the digital camera 10 based on the detection results of the angular velocity detection unit 30 and the posture detection unit. Accordingly, in the digital camera 10 according to the present embodiment, the blur detection unit 70, the angular velocity detection unit 30, and the posture detection unit constitute a blur detection device.

<Blur Correction Amount Calculation Unit>

The blur correction amount calculation unit 90 calculates the blur correction amount based on the blur amount in the yaw direction Yaw and the blur amount in the pitch direction Pit detected by the blur detection unit 70. The blur correction amount is calculated as a movement amount of the blur correction lens 104 necessary for canceling the detected blurring. Since the blur correction lens 104 is provided so as to be movable in the x-axis and y-axis directions by the blur correction mechanism 110, the blur correction amount is calculated as the movement amounts in the x-axis direction and the y-axis direction of the blur correction lens 104 necessary for canceling the blurring.

The calculation result of the blur correction amount calculation unit 90 is output to the blur correction controller 60 as shown in FIG. 4. The blur correction controller 60 controls the driving of the blur correction mechanism 110 to correct the blurring based on the blur correction amount calculated by the blur correction amount calculation unit 90.

[Action of Digital Camera]

Hereinafter, a detection method (blur detection method) of the blurring and correct method (blur correction method) of the blurring performed by the digital camera 10 will be described.

The functions of the blur detection and the blur correction are enabled in a case where the blur correction switch of the operation unit 24 is turned on.

Figure 6:
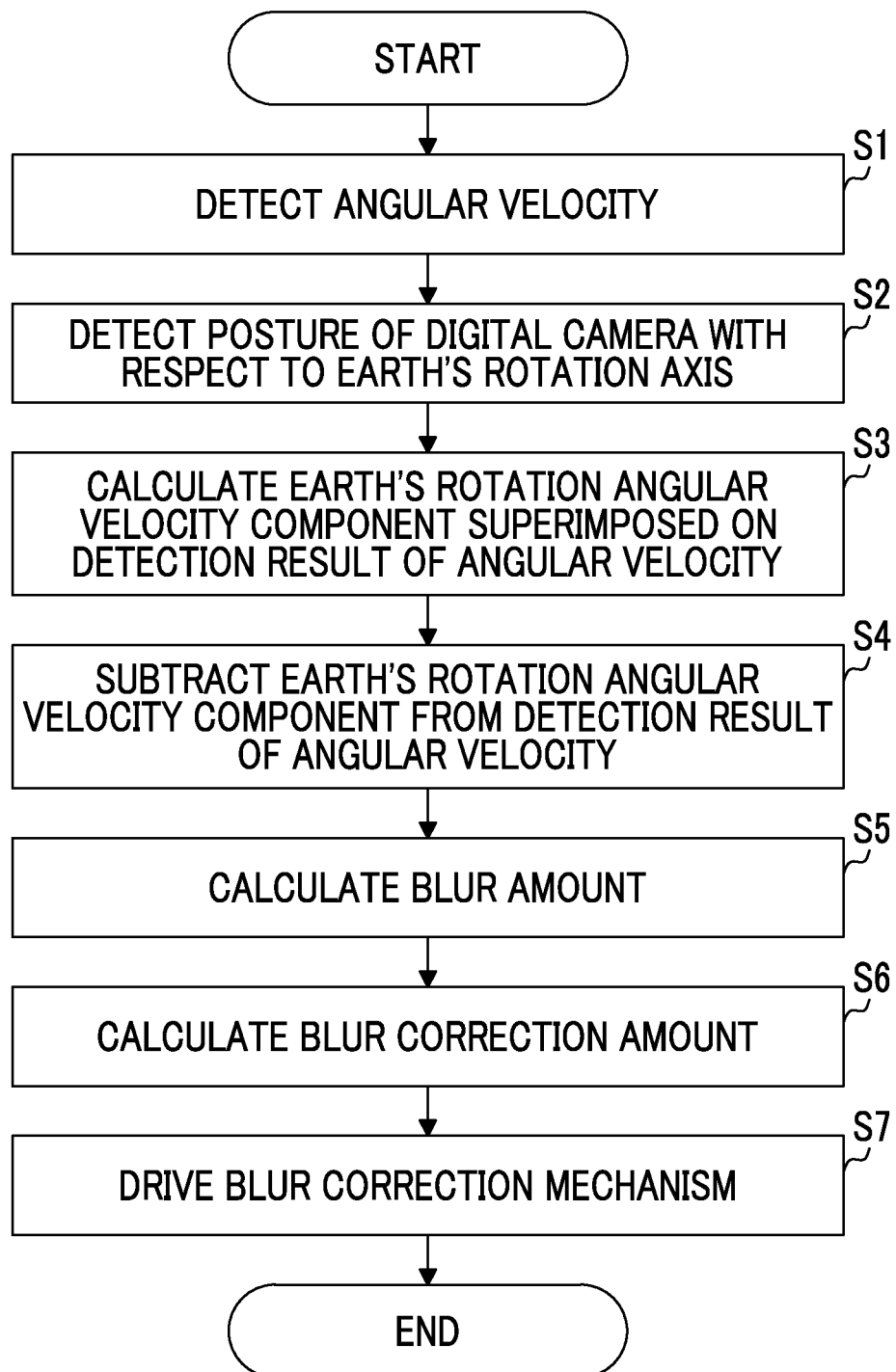
FIG. 6 is a flowchart showing a procedure of blur correction including blur detection.

FIG. 6 is a flowchart illustrating a procedure of the blur correction including the blur detection.

Initially, the angular velocity of the digital camera 10 is detected (step S1). The angular velocity is detected by the angular velocity detection unit 30, and the angular velocities in the yaw direction Yaw and the pitch direction Pit. Here, the angular velocity detected by the angular velocity detection unit 30 is an angular velocity including an angular velocity component due to the Earth's rotation. The detected angular velocities in the yaw direction Yaw and the pitch direction Pit are given to the yaw direction subtraction unit 76A and the pitch direction subtraction unit 76B.

Subsequently, the posture of the digital camera 10 with respect to the Earth's rotation axis is detected (step S2). The posture of the digital camera 10 with respect to the Earth's rotation axis is calculated by the posture calculation unit 72 based on the output of the geomagnetism detection unit 40. The information of the detected posture of the digital camera 10 is given to the rotation angular velocity component calculation unit 74.

Subsequently, the Earth's rotation angular velocity component superimposed on the detection result of the angular velocity is calculated based on the detection result of the posture of the digital camera 10 (step S3). The Earth's rotation angular velocity component is calculated by the rotation angular velocity component calculation unit 74, and the rotation angular velocity components in the yaw direction Yaw and the pitch direction Pit are calculated. The calculated rotation angular velocity components in the yaw direction Yaw and the pitch direction Pit are given to the yaw direction subtraction unit 76A and the pitch direction subtraction unit 76B.

Subsequently, the Earth's rotation angular velocity component is subtracted from the detection result of the angular velocity (step S4). That is, the Earth's rotation angular velocity component in the yaw direction Yaw is subtracted from the output of the yaw direction angular velocity detection unit 30A in the yaw direction subtraction unit 76A. The Earth's rotation angular velocity component in the pitch direction Pit is subtracted from the output of the pitch direction angular velocity detection unit 30B in the pitch direction subtraction unit 76B. Accordingly, an angular velocity of true shake, that is, an angular velocity of a true shake in which the Earth's rotation angular velocity component is removed is acquired in each direction of the yaw direction Yaw and the pitch direction Pit. The subtracted angular velocities in the yaw direction Yaw and the pitch direction Pit are given to the yaw direction blur amount calculation unit 78A and the pitch direction blur amount calculation unit 78B.

Subsequently, the blur amounts in the yaw direction Yaw and the pitch direction Pit are calculated from the angular velocities in the yaw direction Yaw and the pitch direction Pit after the subtraction processing (step S5). The blur amounts in the yaw direction Yaw and the pitch direction Pit are calculated in the yaw direction blur amount calculation unit 78A and the pitch direction blur amount calculation unit 78B. The blur amount in the yaw direction Yaw is calculated by integrating the output of the yaw direction subtraction unit 76A. The blur amount in the pitch direction Pit is calculated by integrating the output of the pitch direction subtraction unit 76B. The calculated blur amounts in the yaw direction Yaw and the pitch direction Pit are given to the blur correction amount calculation unit 90.

Subsequently, the blur correction amount is calculated based on the calculated blur amounts in the yaw direction Yaw and the pitch direction Pit (step S6). The blur correction amount is calculated by the blur correction amount calculation unit 90. The blur correction amount is calculated as the movement amount of the blur correction lens 104 necessary for canceling the blurring, and is calculated in each direction of the x-axis direction and the y-axis direction.

Subsequently, the blur correction mechanism 110 is driven based on the calculated blur correction amount (step S7). Accordingly, the occurred blurring is canceled, and the blurring is corrected.

As stated above, in accordance with the digital camera 10 according to the present embodiment, since the blurring is detected by removing the Earth's rotation angular velocity component from the detection result of the angular velocity, it is possible to appropriately detect the blurring of the angular velocity slower than the Earth's rotation angular velocity. Accordingly, it is possible to appropriately correct the blurring of the angular velocity slower than the Earth's rotation angular velocity. Accordingly, it is possible to lengthen a limit exposure time a capable of securing the function of the blur correction. Therefore, it is possible to appropriately correct the blurring by appropriately detecting the blurring during long time exposure such as night view imaging.

Modification Example of Blur Detection Unit

First Modification Example

<Configuration>

Figure 7:
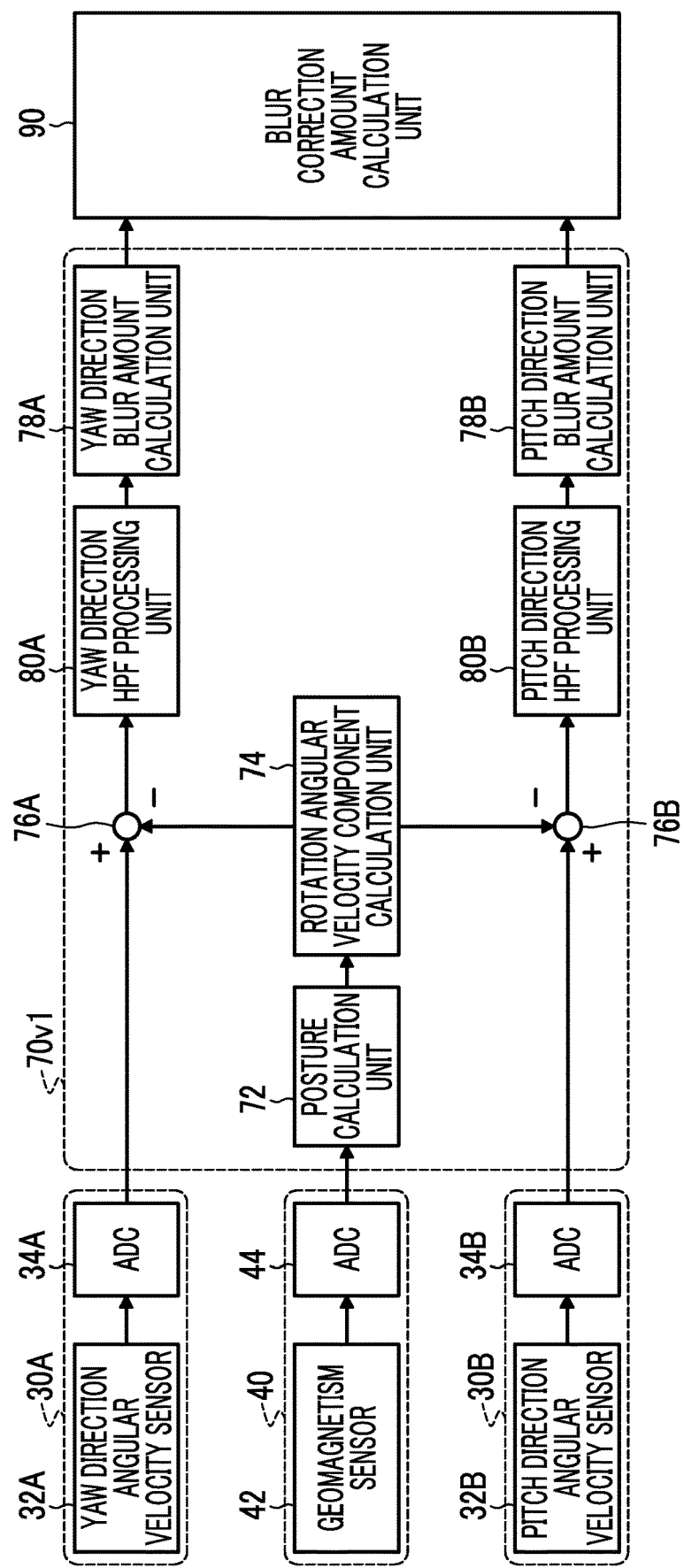
FIG. 7 is a block diagram showing a first modification example of the blur detection unit.

FIG. 7 is a block diagram showing a first modification example of the blur detection unit.

As shown in this drawing, a blur detection unit 70v1 of the present example is different from the blur detection unit 70 according to the aforementioned embodiment in that a yaw direction HPF processing unit 80A that performs high pass filter (HPF) processing of the output of the yaw direction subtraction unit 76A and a pitch direction HPF processing unit 80B that performs HPF processing of the output of the pitch direction subtraction unit 76B are further provided.

The yaw direction HPF processing unit (yaw direction high pass filter processing unit) 80A performs the HPF processing of the output of the yaw direction subtraction unit 76A, and outputs the processed output to the yaw direction blur amount calculation unit 78A.

The pitch direction HPF processing unit (pitch direction high pass filter processing unit) 80B performs the HPF processing of the output of the pitch direction subtraction unit 76B, and outputs the processed output to the pitch direction blur amount calculation unit 78B.

Cutoff frequencies of the yaw direction HPF processing unit 80A and the pitch direction HPF processing unit 80B are set such that the influence of a zero variation of the angular velocity detection unit 30 is eliminated. However, the cutoff frequency is set to be a value lower than a frequency of the blurring caused by the Earth's rotation.

<Action>

Figure 8:
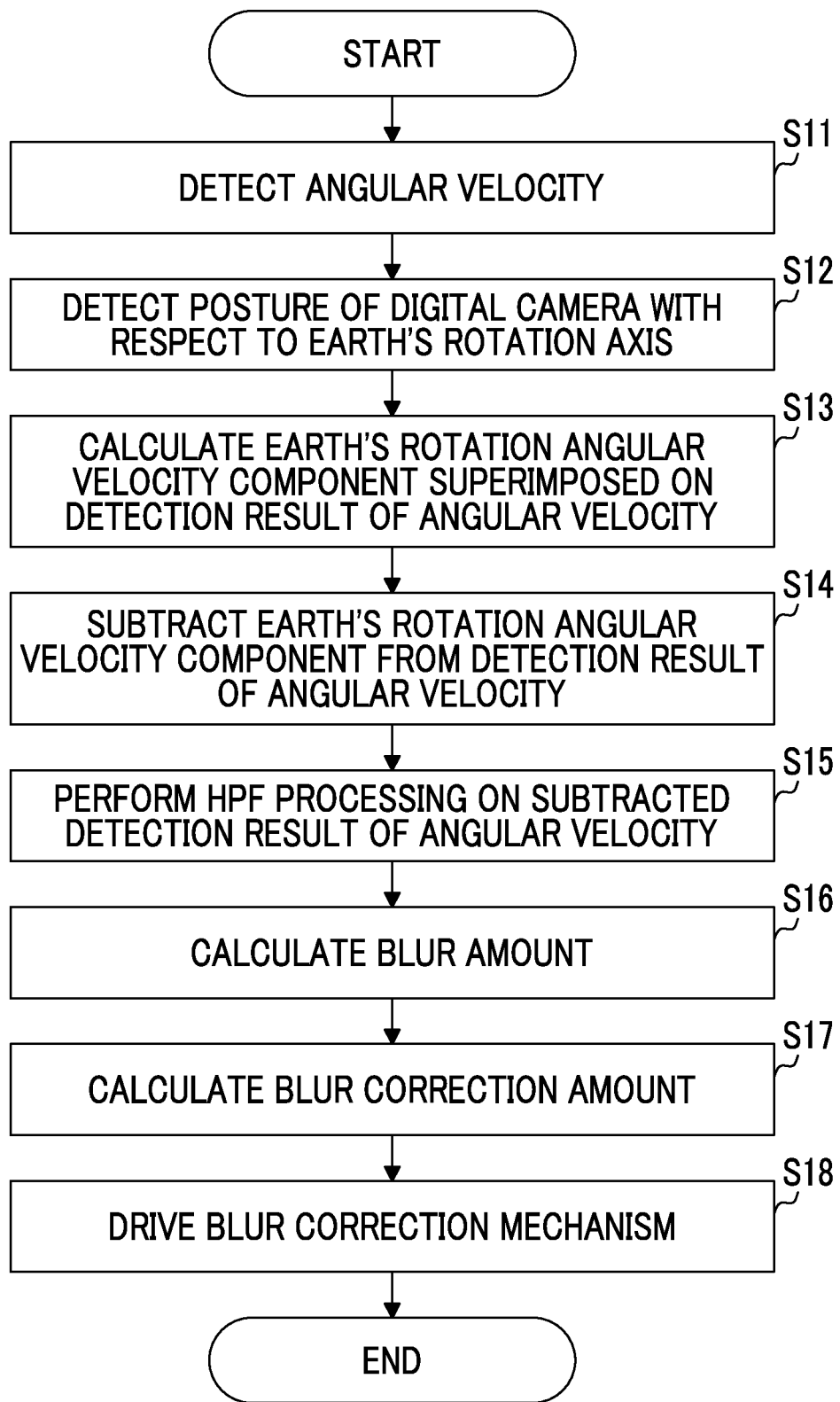
FIG. 8 is a flowchart showing a procedure of the blur correction including the blur detection.

FIG. 8 is a flowchart showing a procedure of the blur correction including the blur detection.

Initially, the angular velocity of the digital camera 10 is detected in the angular velocity detection unit 30 (step S11).

Subsequently, the posture of the digital camera 10 with respect to the Earth's rotation axis is detected based on the output of the geomagnetism detection unit 40 (step S12).

Subsequently, the Earth's rotation angular velocity superimposed on the detection result of the angular velocity is calculated based on the detection result of the posture of the digital camera 10 with respect to the Earth's rotation axis (step S13).

Subsequently, the Earth's rotation angular velocity components are subtracted from the detection results of the angular velocities in the yaw direction Yaw and the pitch direction Pit in the yaw direction subtraction unit 76A and the pitch direction subtraction unit 76B (step S14).

Subsequently, the HPF processing is performed on the subtracted detection results of the angular velocities in the yaw direction Yaw and the pitch direction Pit (step S15). That is, the output of the yaw direction subtraction unit 76A is given to the yaw direction HPF processing unit 80A, and the HPF processing is performed on the given output. The output of the pitch direction subtraction unit 76B is given to the pitch direction HPF processing unit 80B, and the HPF processing is performed on the given output. The cutoff frequencies of the yaw direction HPF processing unit 80A and the pitch direction HPF processing unit 80B are set to be values lower than the frequency of the blurring caused by the Earth's rotation. Accordingly, the frequency component lower than the frequency of the blurring caused by the Earth's rotation is removed by performing the HPF processing in the yaw direction HPF processing unit 80A and the pitch direction HPF processing unit 80B.

Subsequently, the blur amounts are calculated from the detection results of the angular velocities after the HPF processing (step S16). That is, the output of the yaw direction HPF processing unit 80A is given to the yaw direction blur amount calculation unit 78A, and the blur amount in the yaw direction Yaw is calculated from the angular velocity in the yaw direction Yaw after the HPF processing. The output of the pitch direction HPF processing unit 80B is given to the pitch direction blur amount calculation unit 78B, and the blur amount in the pitch direction Pit is calculated from the angular velocity in the pitch direction Pit after the HPF processing.

Subsequently, the blur correction amount is calculated by the blur correction amount calculation unit 90 based on the calculated blur amounts in the yaw direction Yaw and the pitch direction Pit (step S17).

Subsequently, the blur correction mechanism 110 is driven based on the calculated blur correction amount (step S18). Accordingly, the occurred blurring is canceled, and the blurring is corrected.

As stated above, in accordance with the blur detection unit 70v1 of the present example, the yaw direction HPF processing unit 80A and the pitch direction HPF processing unit 80B are provided, and the HPF processing is performed on the output of the yaw direction subtraction unit 76A and the output of the pitch direction subtraction unit 76B. The cutoff frequencies of the yaw direction HPF processing unit 80A and the pitch direction HPF processing unit 80B are set to be values lower than the frequency of the blurring caused by the Earth's rotation. Accordingly, it is possible to eliminate the influence of a zero variation such as an offset error of the angular velocity detection unit or a trigger of an amplifier that amplifies the output of the angular velocity detection unit.

As stated above, since the yaw direction HPF processing unit 80A and the pitch direction HPF processing unit 80B are provided for the purpose of eliminating the influence of the zero variation of the output of the angular velocity detection unit 30, the cutoff frequency is set to be a value appropriate for the purpose, and is set to be as low as possible.

Second Modification Example

<Configuration>

Figure 9:
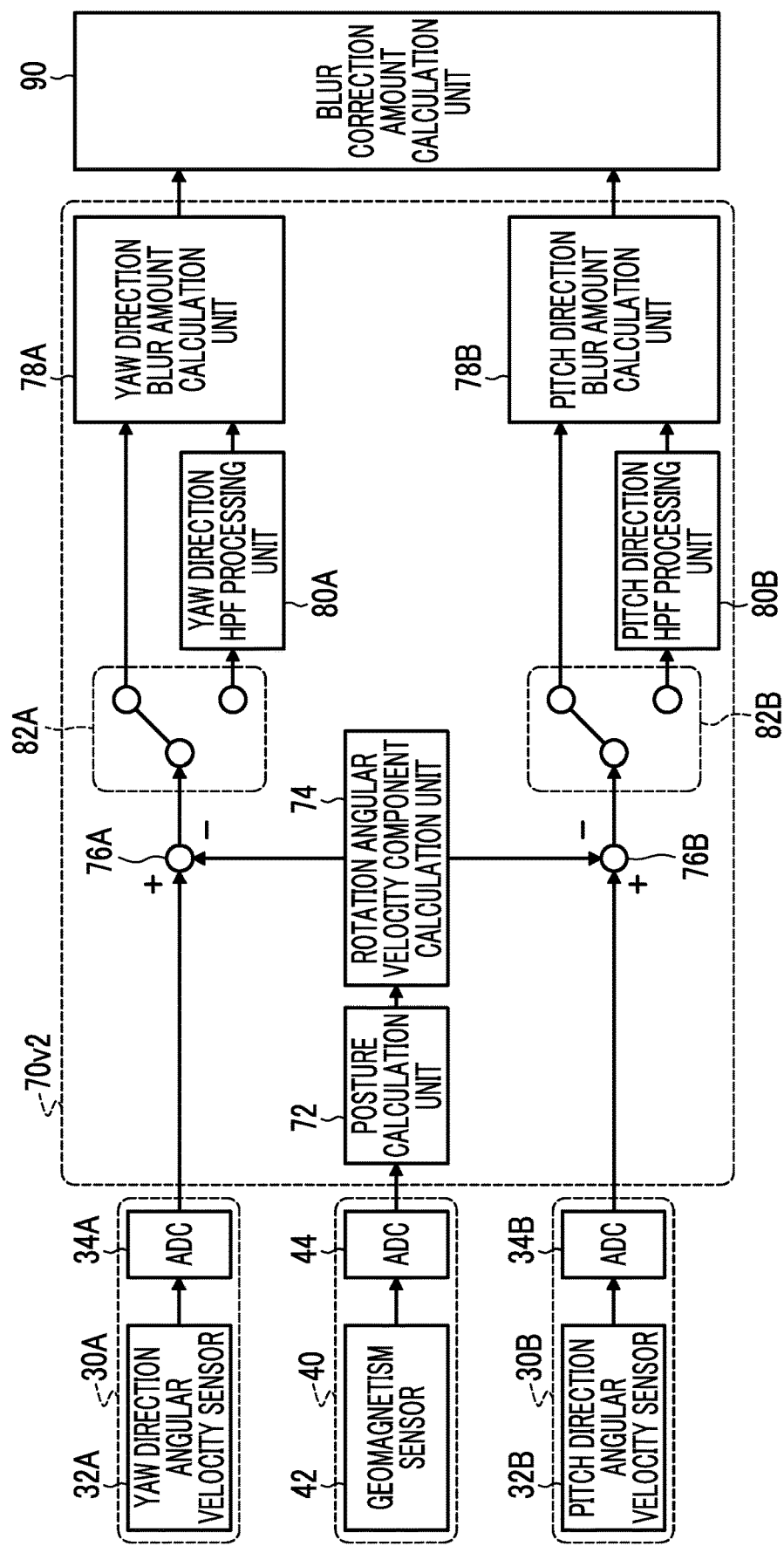
FIG. 9 is a block diagram showing a second modification example of the blur detection unit.

FIG. 9 is a block diagram showing a second modification example of the blur detection unit.

As shown in this drawing, a blur detection unit 70v2 of the present example is different from the blur detection unit 70v1 of the first modification example in that a yaw-direction-subtraction-unit output destination switch unit 82A that switches an output destination of the yaw direction subtraction unit 76A and a pitch-direction-subtraction-unit output destination switch unit 82B that switches an output destination of the pitch direction subtraction unit 76B are further provided.

The yaw-direction-subtraction-unit output destination switch unit 82A switches the output destination of the yaw direction subtraction unit 76A based on a so-called zero output. Specifically, it is determined whether or not the output of the yaw direction subtraction unit 76A is equal to or less than a threshold value, and the output destination of the yaw direction subtraction unit 76A is switched to the yaw direction HPF processing unit 80A or the yaw direction blur amount calculation unit 78A based on the determination result thereof. In a case where the output of the yaw direction subtraction unit 76A is equal to or less than the threshold value, the zero variation is deemed not to be present or to be negligibly small, and the output destination of the yaw direction subtraction unit 76A is set to the yaw direction blur amount calculation unit 78A. Meanwhile, in a case where the output of the yaw direction subtraction unit 76A exceeds the threshold value, the zero variation is deemed to be large, and the output destination of the yaw direction subtraction unit 76A is set to the yaw direction HPF processing unit 80A.

Similar to the pitch-direction-subtraction-unit output destination switch unit 82B, it is determined whether or not the output of the pitch direction subtraction unit 76B is equal to or less than the threshold value, and the output destination of the pitch direction subtraction unit 76B is switched to the pitch direction HPF processing unit 80B or the pitch direction blur amount calculation unit 78B based on the determination result thereof. In a case where the output of the pitch direction subtraction unit 76B is equal to or less than the threshold value, the zero variation is deemed not to be present or to be negligibly small, and the output destination of the pitch direction subtraction unit 76B is set to the pitch direction blur amount calculation unit 78B. Meanwhile, in a case where the output of the pitch direction subtraction unit 76B exceeds the threshold value, the zero variation is deemed to be large, and the output destination of the pitch direction subtraction unit 76B is set to the pitch direction HPF processing unit 80B.

Information of the threshold value necessary for the determination is stored in the ROM.

<Action>

Figure 10:
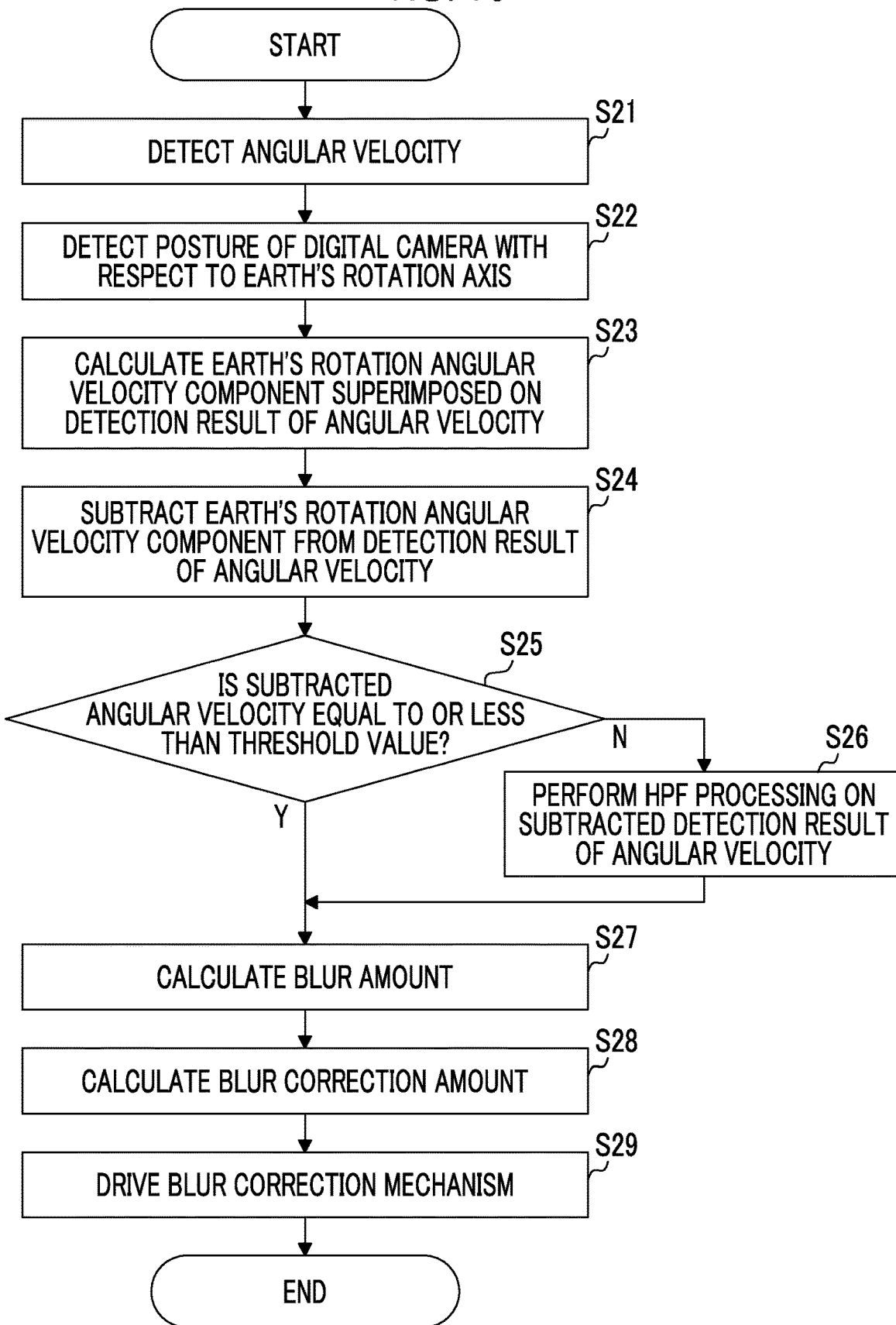
FIG. 10 is a flowchart showing a procedure of the blur correction including the blur detection.

FIG. 10 is a flowchart showing a procedure of the blur correction including the blur detection.

Initially, the angular velocity of the digital camera 10 is detected in the angular velocity detection unit 30 (step S21).

Subsequently, the posture of the digital camera 10 with respect to the Earth's rotation axis is detected based on the output of the geomagnetism detection unit 40 (step S22).

Subsequently, the Earth's rotation angular velocity superimposed on the detection result of the angular velocity detection unit 30 is calculated based on the detection result of the posture of the digital camera 10 with respect to the Earth's rotation axis (step S23).

Subsequently, the Earth's rotation angular velocity components are subtracted from the detection results of the angular velocities in the yaw direction subtraction unit 76A and the pitch direction subtraction unit 76B (step S24).

Subsequently, it is determined whether or not the subtracted detection results of the angular velocities are equal to or less than the threshold value in the yaw-direction-subtraction-unit output destination switch unit 82A and the pitch-direction-subtraction-unit output destination switch unit 82B (step S25). That is, it is determined whether or not the outputs of the yaw direction subtraction unit 76A and the pitch direction subtraction unit 76B are equal to or less than the threshold value.

In a case where the subtracted detection result of the angular velocity exceeds the threshold value, that is, the zero variation is large, the HPF processing is performed on the subtracted detection result of the angular velocity (step S26). That is, the output destination of the yaw direction subtraction unit 76A is set to the yaw direction HPF processing unit 80A by the yaw-direction-subtraction-unit output destination switch unit 82A. Accordingly, the subtracted detection result of the angular velocity in the yaw direction is given to the yaw direction HPF processing unit 80A, and the HPF processing is performed on the given detection result. The output destination of the pitch direction subtraction unit 76B is set to the pitch direction HPF processing unit 80B by the pitch-direction-subtraction-unit output destination switch unit 82B. Accordingly, the subtracted detection result of the angular velocity in the pitch direction is given to the pitch direction HPF processing unit 80B, and the HPF processing is performed on the given detection result.

Thereafter, the blur amount is calculated from the detection result of the angular velocity after the HPF processing (step S27). That is, the output of the yaw direction HPF processing unit 80A is given to the yaw direction blur amount calculation unit 78A, and the blur amount in the yaw direction Yaw is calculated from the angular velocity in the yaw direction Yaw after the HPF processing. The output of the pitch direction HPF processing unit 80B is given to the pitch direction blur amount calculation unit 78B, and the blur amount in the pitch direction Pit is calculated from the angular velocity in the pitch direction Pit after the HPF processing.

Meanwhile, in a case where the subtracted detection result of the angular velocity is equal to or less than the threshold value, that is, the zero variation is sufficiently small, the blur amount is calculated from the subtracted detection result of the angular velocity (step S27). That is, in his case, the outputs of the yaw direction subtraction unit 76A and the pitch direction subtraction unit 76B are directly given to the yaw direction blur amount calculation unit 78A and the pitch direction blur amount calculation unit 78B, and the blur amounts in the yaw direction Yaw and the pitch direction Pit are directly calculated (step S27).

After the calculation of the blur amount, the blur correction amount is calculated based on the calculated blur amount in the blur correction amount calculation unit 90 (step S28). The blur correction mechanism 110 is driven based on the calculated blur correction amount (step S29). Accordingly, the occurred blurring is canceled, and the blurring is corrected.

As stated above, in accordance with the blur detection unit 70v2 of the present example, the output destinations of the yaw direction subtraction unit 76A and the pitch direction subtraction unit 76B are switched depending on whether or not there is the zero variation of the angular velocity sensor. Accordingly, it is possible to more appropriately the blurring. That is, in a case where the zero variation is sufficiently small, the outputs of the yaw direction subtraction unit 76A and the pitch direction subtraction unit 76B are directly given to the yaw direction blur amount calculation unit 78A and the pitch direction blur amount calculation unit 78B. Accordingly, it is possible to appropriately detect the blurring with a lower frequency. In a case where the zero variation is sufficiently small, the outputs of the yaw direction subtraction unit 76A and the pitch direction subtraction unit 76B are given to the yaw direction HPF processing unit 80A and the pitch direction HPF processing unit 80B, and the angular velocities after the HPF processing are given to the yaw direction blur amount calculation unit 78A and the pitch direction blur amount calculation unit 78B. Accordingly, it is possible to detect the blurring by appropriately removing the influence of the zero variation.

Third Modification Example

<Configuration>

Figure 11:
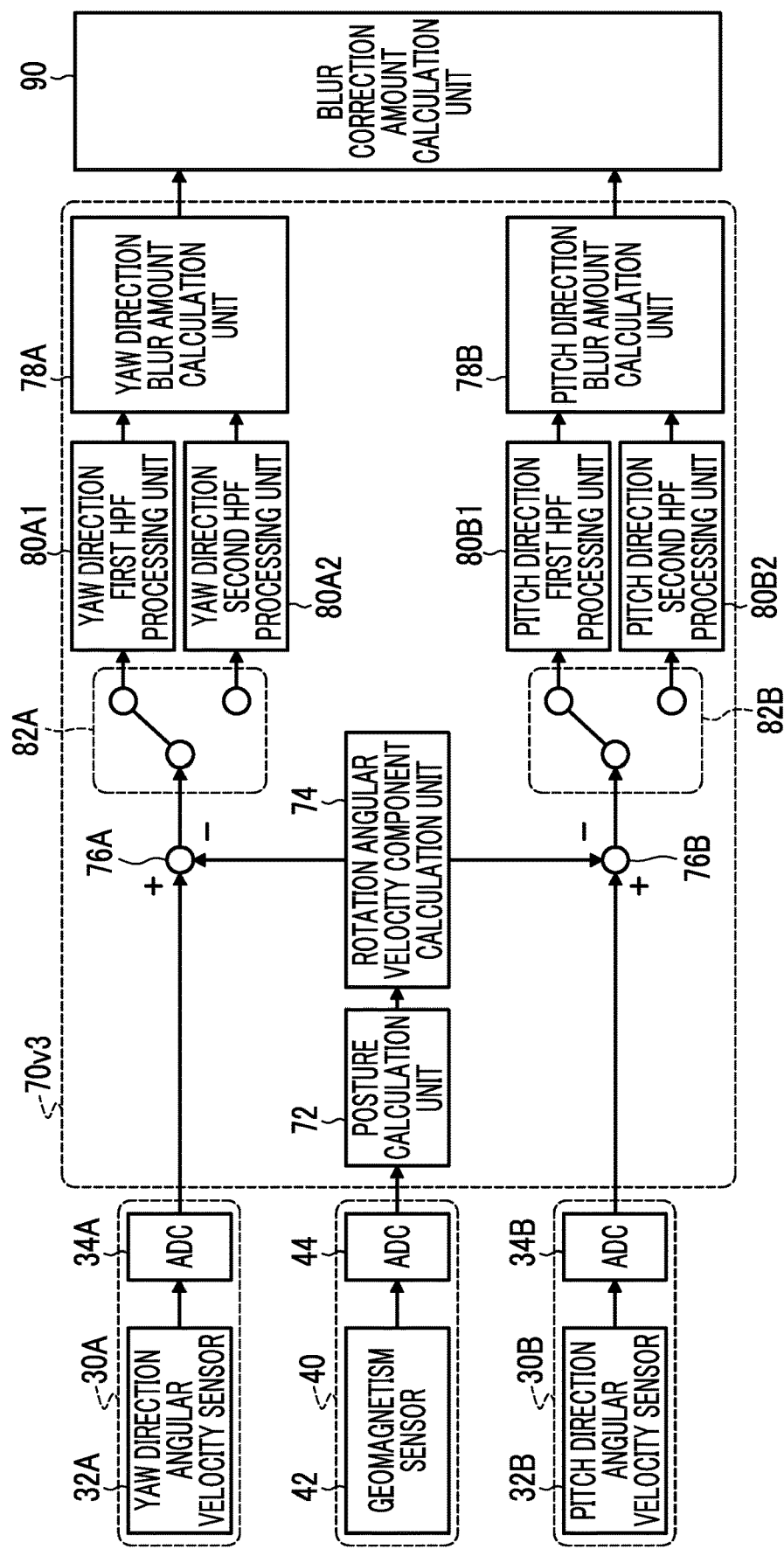
FIG. 11 is a block diagram showing a third modification example of the blur detection unit.

FIG. 11 is a block diagram showing a third modification example of the blur detection unit.

The blur detection unit 70v3 of the present example is different from the blur detection unit 70v2 of the second modification example in that two HPF processing units are provided. Specifically, a yaw direction first HPF processing unit 80A1 and a yaw direction second HPF processing unit 80A2 are provided as the output destination of the yaw direction subtraction unit 76A, and a pitch direction first HPF processing unit 80B1 and a pitch direction second HPF processing unit 80B2 are provided as the output destination of the pitch direction subtraction unit 76B.

A cutoff frequency of the yaw direction first HPF processing unit (yaw direction first high pass filter processing unit) 80A1 is set to be a value higher than the frequency of the blurring caused by the Earth's rotation. The HPF processing is performed on the output of the yaw direction subtraction unit 76A, and the processed output is output to the yaw direction blur amount calculation unit 78A.

A cutoff frequency of the yaw direction second HPF processing unit (yaw direction second high pass filter processing unit) 80A2 is set to be a value lower than the frequency of the blurring caused by the Earth's rotation. The HPF processing is performed on the output of the yaw direction subtraction unit 76A, and the processed output is output to the yaw direction blur amount calculation unit 78A.

A cutoff frequency of the pitch direction first HPF processing unit (pitch direction first high pass filter processing unit) 80B1 is set to be a value higher than the frequency of the blurring caused by the Earth's rotation. The HPF processing is performed on the output of the pitch direction subtraction unit 76B, and the processed output is output to the pitch direction blur amount calculation unit 78B.

A cutoff frequency of the pitch direction second HPF processing unit (pitch direction second high pass filter processing unit) 80B2 is set to be a value lower than the frequency of the blurring caused by the Earth's rotation. The HPF processing is performed on the output of the pitch direction subtraction unit 76B, and the processed output is output to the pitch direction blur amount calculation unit 78B.

The output destinations of the yaw direction subtraction unit 76A and the pitch direction subtraction unit 76B are switched by the yaw-direction-subtraction-unit output destination switch unit 82A and the pitch-direction-subtraction-unit output destination switch unit 82B.

The yaw-direction-subtraction-unit output destination switch unit 82A switches the output destination of the yaw direction subtraction unit 76A based on the exposure time (shutter speed). Specifically, it is determined whether or not the exposure time is equal to or less than the threshold value, and the output destination of the yaw direction subtraction unit 76A is switched to the yaw direction first HPF processing unit 80A1 or the yaw direction second HPF processing unit 80A2 based on the determination result. In a case where the exposure time is equal to or less than the threshold value, the exposure is deemed to be a short-time exposure, and the output destination of the yaw direction subtraction unit 76A is set to the yaw direction first HPF processing unit 80A1. In a case where the exposure time is the short time, the blurring with a low frequency is rarely influenced on the captured image. Accordingly, in this case, the yaw direction first HPF processing unit 80A1 of which the cutoff frequency is set to be high is used. Accordingly, it is possible to appropriately detect the blurring by efficiently removing a component as noise at the time of detecting the blurring. Meanwhile, in a case where the exposure time exceeds the threshold value, the exposure is deemed to be a long-time exposure, and the output destination of the yaw direction subtraction unit 76A is set to the yaw direction second HPF processing unit 80A2. In a case where the exposure time is the long time, the blurring with the low frequency is influenced on the captured image. Accordingly, in this case, the yaw direction second HPF processing unit 80A2 of which the cutoff frequency is set to be low is used. Accordingly, it is possible to appropriately detect the blurring with the low frequency.

Similar to the pitch-direction-subtraction-unit output destination switch unit 82B, the output destination of the pitch direction subtraction unit 76B is switched based on the exposure time. That is, it is determined whether or not the exposure time is equal to or less than the threshold value, and the output destination of the pitch direction subtraction unit 76B is switched to the pitch direction first HPF processing unit 80B1 or the pitch direction second HPF processing unit 80B2 based on the determination result. In a case where the exposure time is equal to or less than the threshold value, the exposure is deemed to be the short-time exposure, and the output destination of the pitch direction subtraction unit 76B is set to the pitch direction first HPF processing unit 80B1. Meanwhile, in a case where the exposure time exceeds the threshold value, the exposure is deemed to be the long-time exposure, and the output destination of the pitch direction subtraction unit 76B is set to the pitch direction second HPF processing unit 80B2.

Information of the threshold value necessary for the determination is stored in the ROM. Information of the exposure time (shutter speed) is acquired from the exposure setting unit 54.

<Action>

Figure 12:
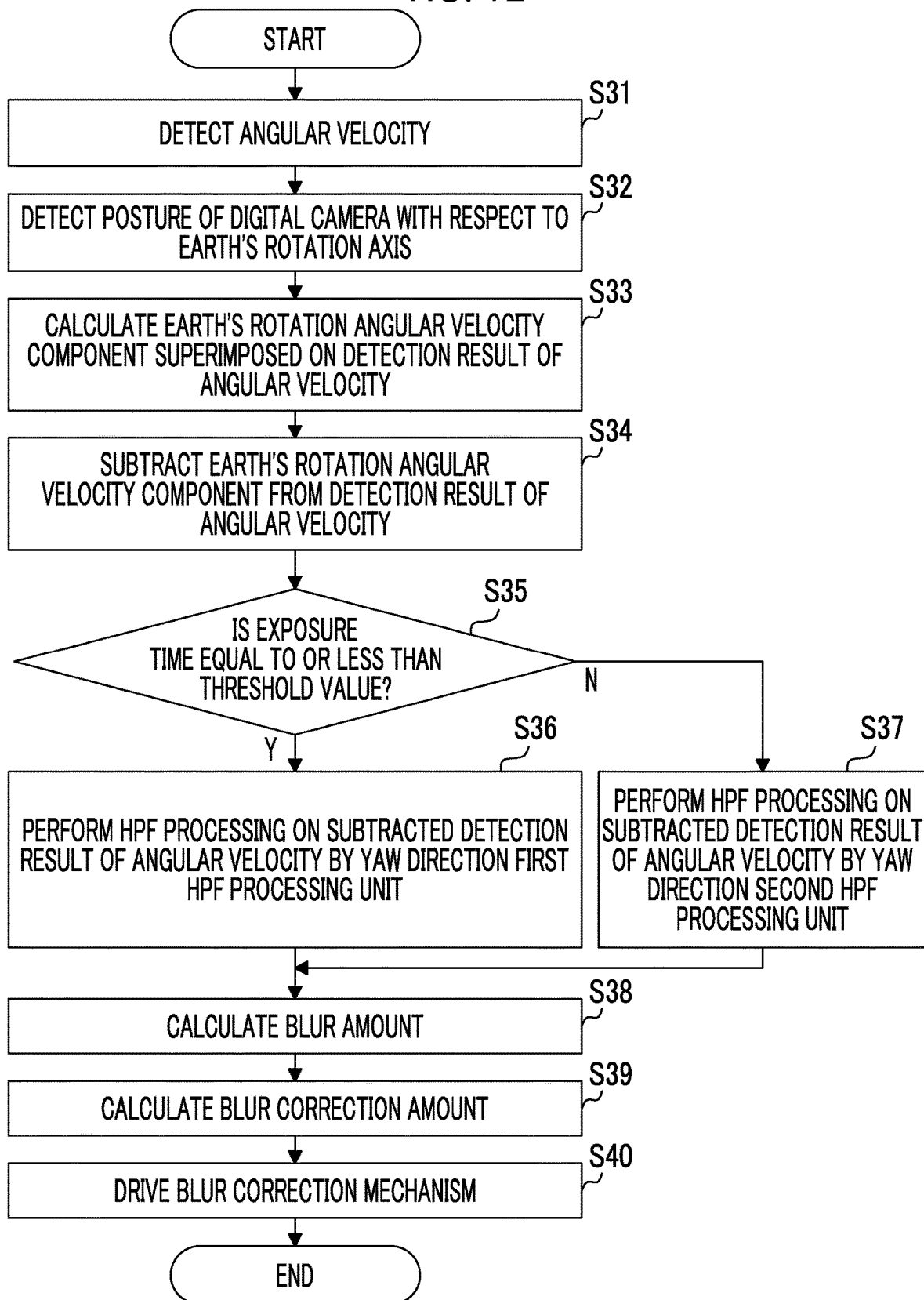
FIG. 12 is a flowchart showing a procedure of the blur correction including the blur detection.

FIG. 12 is a flowchart showing a procedure of the blur correction including the blur detection.

Initially, the angular velocity of the digital camera 10 is detected in the angular velocity detection unit 30 (step S31).

Subsequently, the posture of the digital camera 10 with respect to the Earth's rotation axis is detected based on the output of the geomagnetism detection unit 40 (step S32).

Subsequently, the Earth's rotation angular velocity component superimposed on the detection result of the angular velocity detection unit 30 is calculated based on the detection result of the posture of the digital camera 10 with respect to the Earth's rotation axis (step S33).

Subsequently, the Earth's rotation angular velocity components are subtracted from the detection results of the angular velocities in the yaw direction subtraction unit 76A and the pitch direction subtraction unit 76B (step S34).

Subsequently, it is determined whether or not the exposure time (shutter speed) is equal to or less than the threshold value in the yaw-direction-subtraction-unit output destination switch unit 82A and the pitch-direction-subtraction-unit output destination switch unit 82B (step S35).

In a case where the exposure time is equal to or less than the threshold value, the output destination of the yaw direction subtraction unit 76A is set to the yaw direction first HPF processing unit 80A1 by the yaw-direction-subtraction-unit output destination switch unit 82A. The output destination of the pitch direction subtraction unit 76B is set to the pitch direction first HPF processing unit 80B1 by the pitch-direction-subtraction-unit output destination switch unit 82B. Accordingly, the HPF processing is performed on the subtracted detection results of the angular velocities in the yaw direction Yaw and the pitch direction Pit by the yaw direction first HPF processing unit 80A1 and the pitch direction first HPF processing unit 80B1 (step S36). In a case where the exposure time is the short time, since the blurring with the low frequency is rarely influenced on the captured image, the HPF processing is performed in the yaw direction first HPF processing unit 80A1 of which the cutoff frequency is set to be high. Accordingly, it is possible to appropriately detect the blurring by efficiently removing a noise component at the time of detecting the blurring.

Meanwhile, in a case where the exposure time exceeds the threshold value, the output destination of the yaw direction subtraction unit 76A is set to the yaw direction second HPF processing unit 80A2 by the yaw-direction-subtraction-unit output destination switch unit 82A. The output destination of the pitch direction subtraction unit 76B is set to the pitch direction second HPF processing unit 80B2 by the pitch-direction-subtraction-unit output destination switch unit 82B. Accordingly, the HPF processing is performed on the subtracted detection results of the angular velocities in the yaw direction Yaw and the pitch direction Pit by the yaw direction second HPF processing unit 80A2 and the pitch direction second HPF processing unit 80B2 (step S37). In a case where the exposure time is the long time, since the blurring with the low frequency is rarely influenced on the captured image, the HPF processing is performed in the yaw direction second HPF processing unit 80A2 of which the cutoff frequency is set to be low. Accordingly, it is possible to appropriately detect the blurring with the low frequency.

As stated above, the output destinations of the yaw direction subtraction unit 76A and the pitch direction subtraction unit 76B are set depending on the exposure time (shutter speed), and the HPF processing is performed in each output destination. Thereafter, the blur amount is calculated from the detection result of the angular velocity after the HPF processing (step S38). That is, the output of the yaw direction first HPF processing unit 80A1 or the yaw direction second HPF processing unit 80A2 is given to the yaw direction blur amount calculation unit 78A, and the blur amount in the yaw direction Yaw is calculated from the angular velocity in the yaw direction Yaw after the HPF processing. The output of the pitch direction first HPF processing unit 80B1 or the pitch direction second HPF processing unit 80B2 is given to the pitch direction blur amount calculation unit 78B, and the blur amount in the pitch direction Pit is calculated from the angular velocity in the pitch direction Pit after the HPF processing.

After the calculation of the blur amount, the blur correction amount is calculated in the blur correction amount calculation unit 90 based on the calculated blur amount (step S39). The blur correction mechanism 110 is driven based on the calculated blur correction amount (step S40). Accordingly, the occurred blurring is canceled, and the blurring is corrected.

As stated above, in accordance with the blur detection unit 70*v*3 of the present example, the output destinations of the yaw direction subtraction unit 76A and the pitch direction subtraction unit 76B are switched depending on the exposure time. Accordingly, it is possible to appropriately detect the blurring. That is, in a case where the exposure time is short, the HPF processing is performed in the yaw direction first HPF processing unit 80A1 of which the cutoff frequency is set to be high, and thus, it is possible to efficiently remove the component as the noise at the time of detecting the blurring. Accordingly, it is possible to appropriately detect the blurring. Meanwhile, in a case where the exposure time is long, the HPF processing is performed in the yaw direction second HPF processing unit 80A2 of which the cutoff frequency is set to be low, and thus, it is possible to appropriately detect the blurring with the low frequency.

<Preferred Threshold Value of Exposure Time>

It is preferable that the threshold value of the exposure time is set with consideration for the influence of the Earth's rotation on the detection of the blurring.

In a case where it is assumed that a time required for detecting the blurring for a pixel pitch due to the Earth's rotation is a limit exposure time, it is preferable that this limit exposure time is used as the threshold value of the exposure time.

Here, the pixel pitch is a distance between center lines of the pixels of the image sensor. The time required for detecting the blurring for the pixel pitch due to the Earth's rotation is a time at which an angle calculated by integrating the Earth's rotation angular velocity becomes an angle of one pixel pitch of the image sensor.

In a case where the Earth's rotation angular velocity is $\omega e$[deg/sec] and an angle per one pixel pitch of the image sensor is $\theta e$[deg], a limit exposure time Tex[sec] is calculated by Tex=$\theta e/\omega e$.

The threshold value of the exposure time is set to the limit exposure time Tex, and thus, the influence of the Earth's rotation is eliminated in a case where the exposure is performed for a time longer than the limit exposure time Tex. Accordingly, it is possible to appropriately detect blurring with a lower frequency.

<Switching of Output Destination of Subtraction Unit Based on Imaging Condition>

Although it has been descried in the aforementioned example that the yaw-direction-subtraction-unit output destination switch unit 82A and the pitch-direction-subtraction-unit output destination switch unit 82B switch the output destinations of the yaw direction subtraction unit 76A and the pitch direction subtraction unit 76B based on the exposure time, the yaw-direction-subtraction-unit output destination switch unit 82A and the pitch-direction-subtraction-unit output destination switch unit 82B may switch the output destinations of the yaw direction subtraction unit 76A and the pitch direction subtraction unit 76B based on other imaging conditions.

For example, the output destinations of the yaw direction subtraction unit 76A and the pitch direction subtraction unit 76B may be switched depending on the imaging mode. For example, it is determined whether or not a mode in which the long-time exposure is performed is selected as the imaging mode, and the output destinations of the yaw direction subtraction unit 76A and the pitch direction subtraction unit 76B are switched depending on the determination result. The mode in which the long-time exposure is performed corresponds to a mode in which the imaging is performed with low shutter speed, for example, the night view mode. The night view mode is the imaging mode in which the exposure control appropriate for the night view imaging is performed.

In a case where the mode such as the night view mode in which the long-time exposure is performed is not selected, the output destinations of the yaw direction subtraction unit 76A and the pitch direction subtraction unit 76B are set to the yaw direction first HPF processing unit 80A1 and the pitch direction first HPF processing unit 80B1. In a case where the mode in which the long-time exposure is performed is not selected, the exposure is the short-time exposure, and the blurring with the low frequency is rarely influenced on the captured image. Accordingly, in this case, the HPF processing is performed on the detection results of the angular velocities by using the yaw direction first HPF processing unit 80A1 and the pitch direction first HPF processing unit 80B1 of which the cutoff frequency is set to be high. Accordingly, it is possible to appropriately detect the blurring necessary for the correction.

Meanwhile, in a case where the mode such as the night view mode in which the long-time exposure is performed is selected, the output destinations of the yaw direction subtraction unit 76A and the pitch direction subtraction unit 76B are set to the yaw direction second HPF processing unit 80A2 and the pitch direction second HPF processing unit 80B2. In a case where the mode in which the long-time exposure is performed is selected, the exposure is the long-time exposure, and the blurring with the low frequency is rarely influenced on the captured image. Accordingly, in this case, the HPF processing is performed on the detection results of the angular velocities by using the yaw direction second HPF processing unit 80A2 and the pitch direction second HPF processing unit 80B2 of which the cutoff frequency is set to be low. Accordingly, it is possible to appropriately detect the blurring with the low frequency.

Although it has been described in the present example that the imaging mode is used as the imaging condition, the output destinations of the yaw direction subtraction unit 76A and the pitch direction subtraction unit 76B may be switched based on other imaging condition. The output destinations of the yaw direction subtraction unit 76A and the pitch direction subtraction unit 76B may be switched by complexly determining a plurality of imaging conditions.

Fourth Modification Example

<Configuration>

Figure 13:
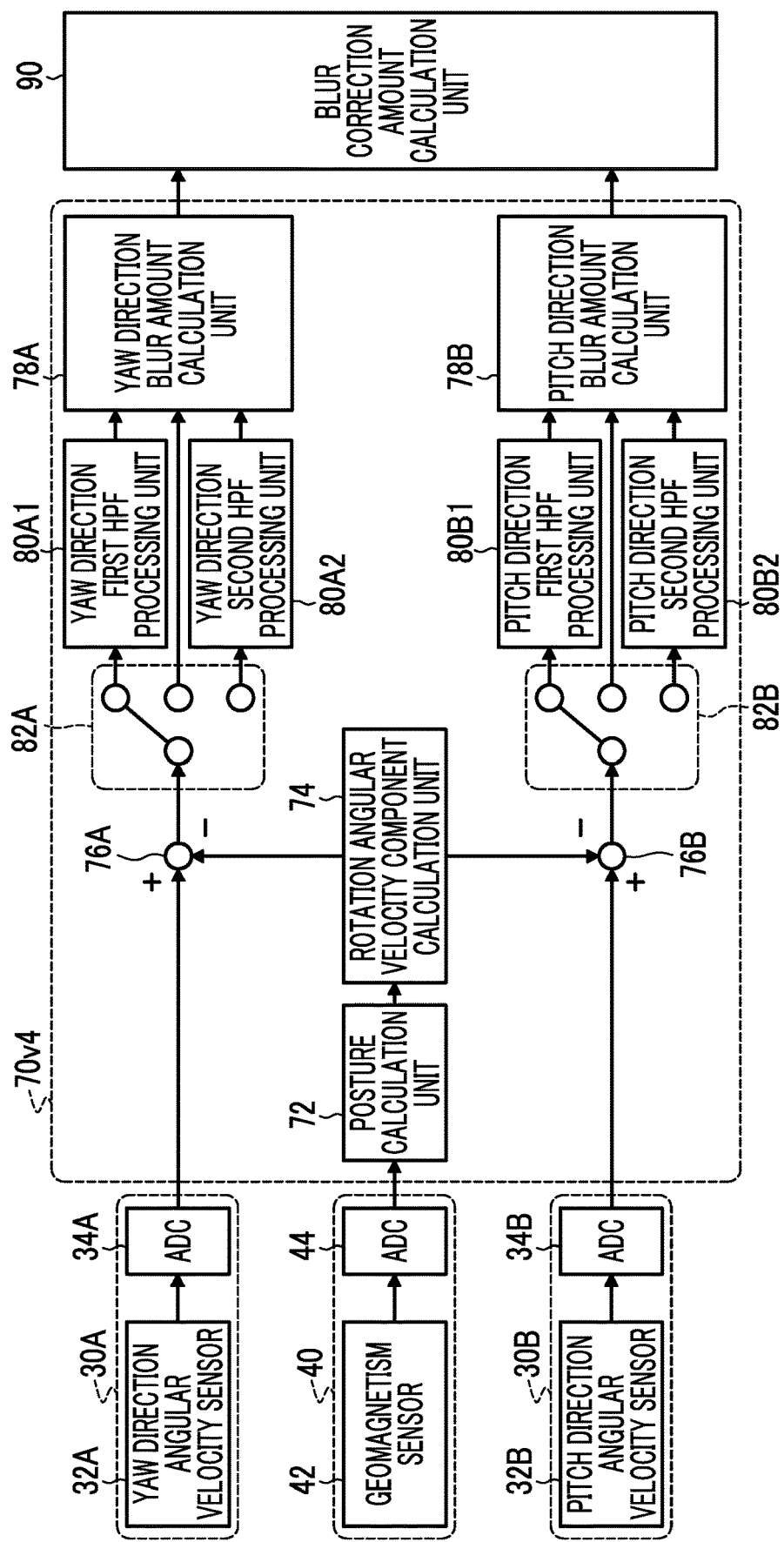
FIG. 13 is a block diagram showing a fourth modification example of the blur detection unit.

FIG. 13 is a block diagram showing a fourth modification example of the blur detection unit.

As shown in this drawing, a blur detection unit 70v4 of the present example is different from the blur detection unit 70v3 of the third modification example in that three output destinations of the yaw direction subtraction unit 76A and the pitch direction subtraction unit 76B switched by the yaw-direction-subtraction-unit output destination switch unit 82A and the pitch-direction-subtraction-unit output destination switch unit 82B are provided.

The yaw-direction-subtraction-unit output destination switch unit 82A switches the output destination of the yaw direction subtraction unit 76A based on the exposure time and the zero output. Specifically, it is initially determined whether or not the exposure time is equal to or less than the threshold value. As the determination result, in a case where the exposure time is equal to or less than the threshold value, the output destination of the yaw direction subtraction unit 76A is set to the yaw direction first HPF processing unit 80A1. Meanwhile, in a case where the exposure time exceeds the threshold value, it is further determined whether or not the output of the yaw direction subtraction unit 76A is equal to or less than the threshold value. In a case where the output of the yaw direction subtraction unit 76A is equal to or less than the threshold value, the output destination of the yaw direction subtraction unit 76A is set to the yaw direction blur amount calculation unit 78A. Meanwhile, in a case where the output of the yaw direction subtraction unit 76A exceeds the threshold value, the output destination of the yaw direction subtraction unit 76A is set to the yaw direction second HPF processing unit 80A2.

The same is true of the pitch-direction-subtraction-unit output destination switch unit 82B, it is initially determined whether or not the exposure time is equal to or less than the threshold value. As the determination result, in a case where the exposure time is equal to or less than the threshold value, the output destination of the pitch direction subtraction unit 76B is set to the pitch direction first HPF processing unit 80B1. Meanwhile, in a case where the exposure time exceeds the threshold value, it is further determined whether or not the output of the pitch direction subtraction unit 76B is equal to or less than the threshold value. In a case where the output of the pitch direction subtraction unit 76B is equal to or less than the threshold value, the output destination of the pitch direction subtraction unit 76B is set to the pitch direction blur amount calculation unit 78B. Meanwhile, in a case where the output of the pitch direction subtraction unit 76B exceeds the threshold value, the output destination of the pitch direction subtraction unit 76B is set to the pitch direction second HPF processing unit 80B2.

In a case where the exposure time is equal to or less than the threshold value, the exposure is the short-time exposure, and the blurring with the low frequency is rarely influenced on the captured image. Accordingly, in this case, the yaw direction first HPF processing unit 80A1 and the pitch direction first HPF processing unit 80B1 of which the cutoff frequency is set to be high are set to the yaw direction subtraction unit 76A and the pitch direction subtraction unit 76B. Accordingly, it is possible to appropriately detect the blurring by efficiently removing a component as noise at the time of detecting the blurring.

Meanwhile, in a case where the exposure time exceeds the threshold value, the exposure is the long-time exposure, and the blurring with the low frequency is influenced on the captured image. In this case, the HPF processing is not preferably performed in order to detect the blurring with the lower frequency. However, in a case where the zero variation of the angular velocity sensor is large, erroneous detection occurs. Thus, in the present example, in a case where the exposure time exceeds the threshold value, it is determined whether or not the outputs of the yaw direction subtraction unit 76A and the pitch direction subtraction unit 76B are equal to or less than the threshold value, and the output destinations of the yaw direction subtraction unit 76A and the pitch direction subtraction unit 76B are set to the yaw direction blur amount calculation unit 78A and the pitch direction blur amount calculation unit 78B only in a case where the exposure time is equal to or less than the threshold value. Accordingly, it is possible to appropriately detect vibration with the low frequency.

Information of the threshold value necessary for the determination is stored in the ROM.

<Action>

Figure 14:
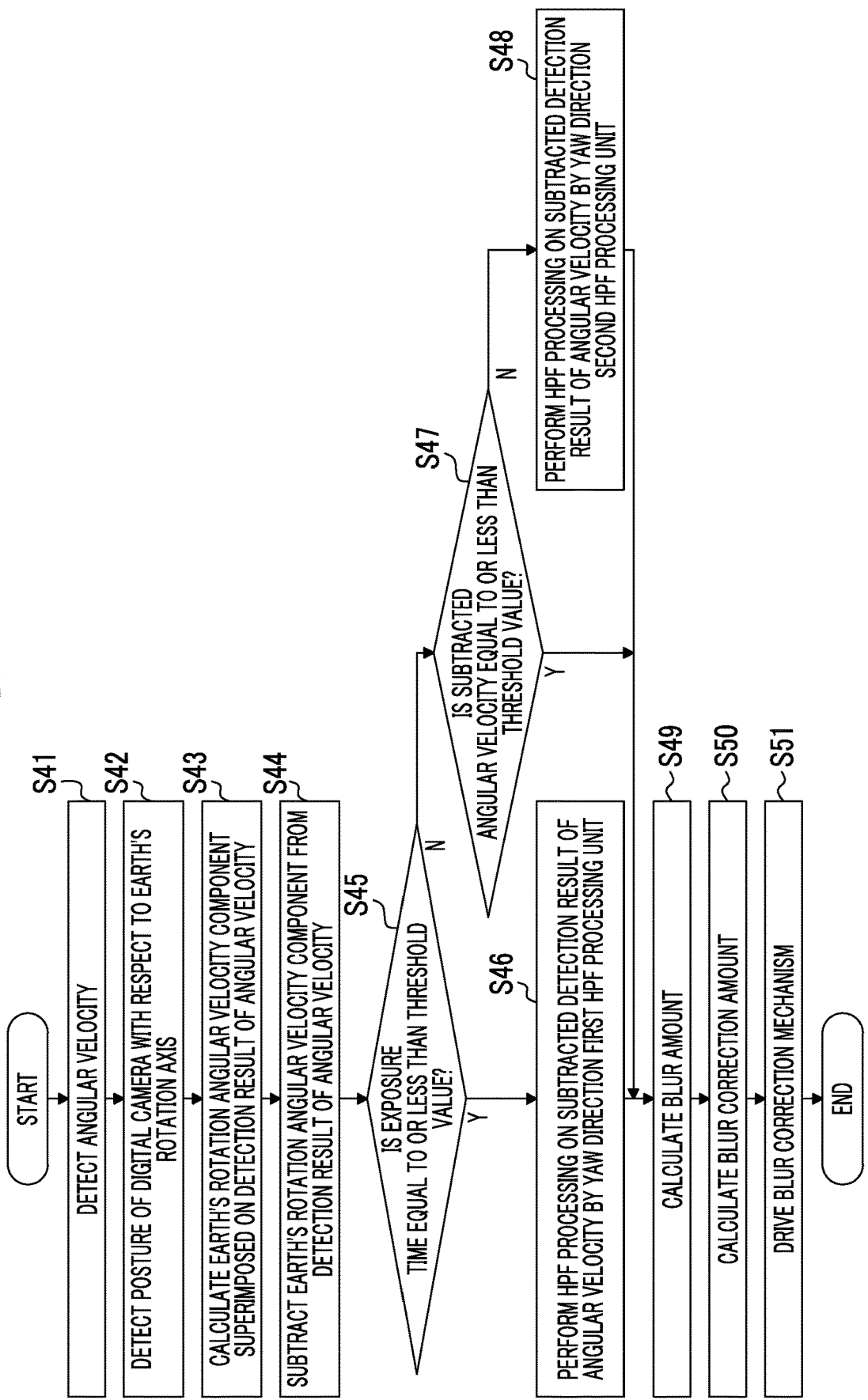
FIG. 14 is a flowchart showing a procedure of the blur correction including the blur detection.

FIG. 14 is a flowchart showing a procedure of the blur detection including the blur detection.

Initially, the angular velocity of the digital camera 10 is detected in the angular velocity detection unit 30 (step S41).

Subsequently, the posture of the digital camera 10 with respect to the Earth's rotation axis is detected based on the output of the geomagnetism detection unit 40 (step S42).

Subsequently, the Earth's rotation angular velocity component superimposed on the detection result of the angular velocity detection unit 30 is calculated based on the detection result of the posture of the digital camera 10 with respect to the Earth's rotation axis (step S43).

The Earth's rotation angular velocity components are subtracted from the detection results of the angular velocities in the yaw direction subtraction unit 76A and the pitch direction subtraction unit 76B (step S44).

Subsequently, it is determined whether or not the exposure time (shutter speed) is equal to or less than the threshold value in the yaw-direction-subtraction-unit output destination switch unit 82A and the pitch-direction-subtraction-unit output destination switch unit 82B (step S45). It is assumed that this determination is first determination.

In a case where the exposure time is equal to or less than the threshold value, the output destinations of the yaw direction subtraction unit 76A and the pitch direction subtraction unit 76B are set to the yaw direction first HPF processing unit 80A1 and the pitch direction first HPF processing unit 80B1 by the yaw-direction-subtraction-unit output destination switch unit 82A and the pitch-direction-subtraction-unit output destination switch unit 82B1. Accordingly, the HPF processing is performed on the subtracted detection results of the angular velocities in the yaw direction Yaw and the pitch direction Pit by the yaw direction first HPF processing unit 80A1 and the pitch direction first HPF processing unit 80B (step S46). Thereafter, the blur amount is calculated from the detection result of the angular velocity after the HPF processing (step S49). That is, the outputs of the yaw direction first HPF processing unit 80A1 and the pitch direction first HPF processing unit 80B1 are given to the yaw direction blur amount calculation unit 78A and the pitch direction blur amount calculation unit 78B, and the blur amounts in the yaw direction Yaw and the pitch direction Pit are calculated.

Meanwhile, in a case where the exposure time exceeds the threshold value, it is further determined whether or not the subtracted detection result of the angular velocity is equal to or less than the threshold value (step S47). That is, it is determined whether or not the outputs of the yaw direction subtraction unit 76A and the pitch direction subtraction unit 76B are equal to or less than the threshold value. It is assumed that this determination is second determination.

In a case where the subtracted detection result of the angular velocity exceeds the threshold value, the output destinations of the yaw direction subtraction unit 76A and the pitch direction subtraction unit 76B are set to the yaw direction second HPF processing unit 80A2 and the pitch direction second HPF processing unit 80B2. Accordingly, the HPF processing is performed on the outputs of the yaw direction subtraction unit 76A and the pitch direction subtraction unit 76B by the yaw direction second HPF processing unit 80A2 and the pitch direction second HPF processing unit 80B2 (step S48). Thereafter, the blur amount is calculated from the detection result of the angular velocity after the HPF processing (step S49). That is, the outputs of the yaw direction second HPF processing unit 80A2 and the pitch direction second HPF processing unit 80B2 are given to the yaw direction blur amount calculation unit 78A and the pitch direction blur amount calculation unit 78B, and the blur amounts in the yaw direction Yaw and the pitch direction Pit are calculated.

Meanwhile, in a case where the subtracted detection result of the angular velocity is equal to or less than the threshold value, the output destinations of the yaw direction subtraction unit 76A and the pitch direction subtraction unit 76B are set to the yaw direction blur amount calculation unit 78A and the pitch direction blur amount calculation unit 78B. Accordingly, the blur amounts in the yaw direction Yaw and the pitch direction Pit are directly calculated from the outputs of the yaw direction subtraction unit 76A and the pitch direction subtraction unit 76B (step S49).

After the calculation of the blur amount, the correction amount is calculated based on the calculated blur amount in the blur correction amount calculation unit 90 (step S50). The blur correction mechanism 110 is driven based on the calculated blur correction amount (step S51). Accordingly, the occurred blurring is canceled, and the blurring is corrected.

As stated above, in accordance with the blur detection unit 70v4 of the present example, the output destinations of the yaw direction subtraction unit 76A and the pitch direction subtraction unit 76B are switched based on the exposure time and the zero variation. Accordingly, it is possible to appropriately detect the blurring. That is, in a case where the exposure time is short, the HPF processing is performed in the yaw direction first HPF processing unit 80A1 of which the cutoff frequency is set to be high, and thus, it is possible to efficiently remove the component as the noise at the time of detecting the blurring. Accordingly, it is possible to appropriately detect the blurring. Meanwhile, in a case where the exposure time is long, since it is determined whether or not to perform the HPF processing depending on whether or not there is the zero variation, it is possible to appropriately detect the blurring with the low frequency.

Although it has been described in the present example that the first determination is performed based on the exposure time, the first determination may be performed based on other imaging conditions such as the imaging mode.

Fifth Modification Example

Figure 15:
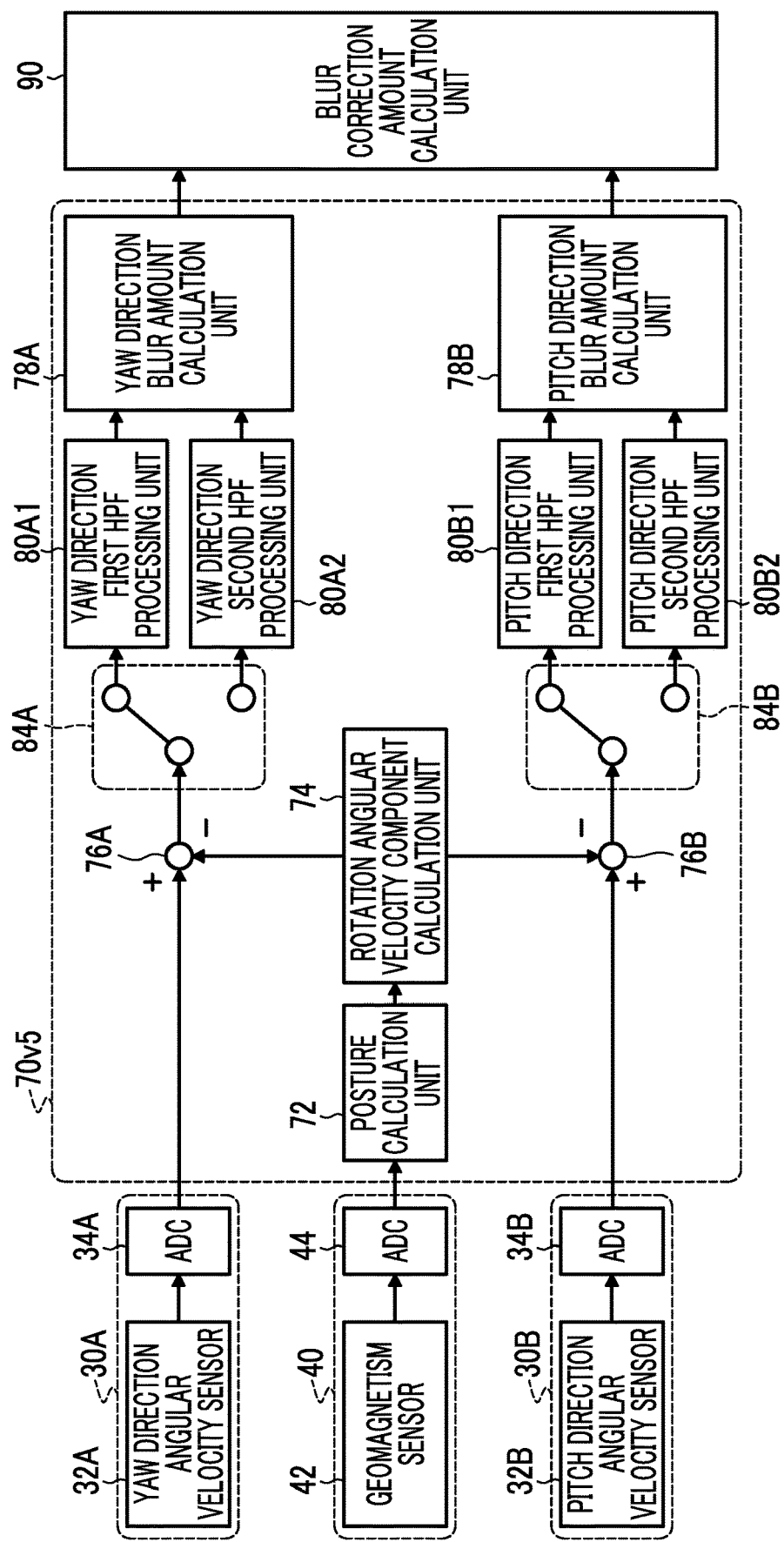
FIG. 15 is a block diagram showing a fifth modification example of the blur detection unit.

FIG. 15 is a block diagram showing a fifth modification example of the blur detection unit.

A blur detection unit 70v5 of the present example is different from the blur detection unit 70v3 of the third modification example in that a yaw-direction-subtraction-unit output destination setting unit 84A and a pitch-direction-subtraction-unit output destination setting unit 84B are provided and the output destinations of the yaw direction subtraction unit 76A and the pitch direction subtraction unit 76B are manually set by the user.

The yaw-direction-subtraction-unit output destination setting unit 84A and the pitch-direction-subtraction-unit output destination setting unit 84B switch the output destinations of the yaw direction subtraction unit 76A and the pitch direction subtraction unit 76B based on the operation of the operation unit 24. That is, the yaw direction subtraction unit 76A is set to the yaw direction first HPF processing unit 80A1 or the yaw direction second HPF processing unit 80A2. The pitch direction first HPF processing unit 80B1 or the pitch direction second HPF processing unit 80B2 is set to the pitch direction subtraction unit 76B.

The operation unit 24 comprises, for example, a changeover switch as operation means for switching the output destinations of the yaw direction subtraction unit 76A and the pitch direction subtraction unit 76B. For example, the changeover switch can switch between "HIGH" and "LOW". In a case where the changeover switch is set to "HIGH", the output destinations of the yaw direction subtraction unit 76A and the pitch direction subtraction unit 76B are set to the yaw direction first HPF processing unit 80A1 and the pitch direction first HPF processing unit 80B1. In a case where the changeover switch is set to "LOW", the output destinations of the yaw direction subtraction unit 76A and the pitch direction subtraction unit 76B are set to the yaw direction second HPF processing unit 80A2 and the pitch direction second HPF processing unit 80B2.

In a case where the imaging is performed with a low shutter speed as in the night view imaging, the user sets the changeover switch to "LOW". Accordingly, it is possible to appropriately detect the blurring with the low frequency by eliminating the influence due to the Earth's rotation.

Meanwhile, in normal imaging, the changeover switch is set to "HIGH". Accordingly, it is possible to appropriately detect the blurring by appropriately removing a component as noise at the time of detecting the blurring.

Although it has been described in the present example that the output destinations of the yaw direction subtraction unit 76A and the pitch direction subtraction unit 76B are switched by the changeover switch, operation means for switching the output destinations of the yaw direction subtraction unit 76A and the pitch direction subtraction unit 76B are not limited to thereto. In addition, for example, it is possible to set the output destination by using a menu screen.

Sixth Modification Example

Figure 16:
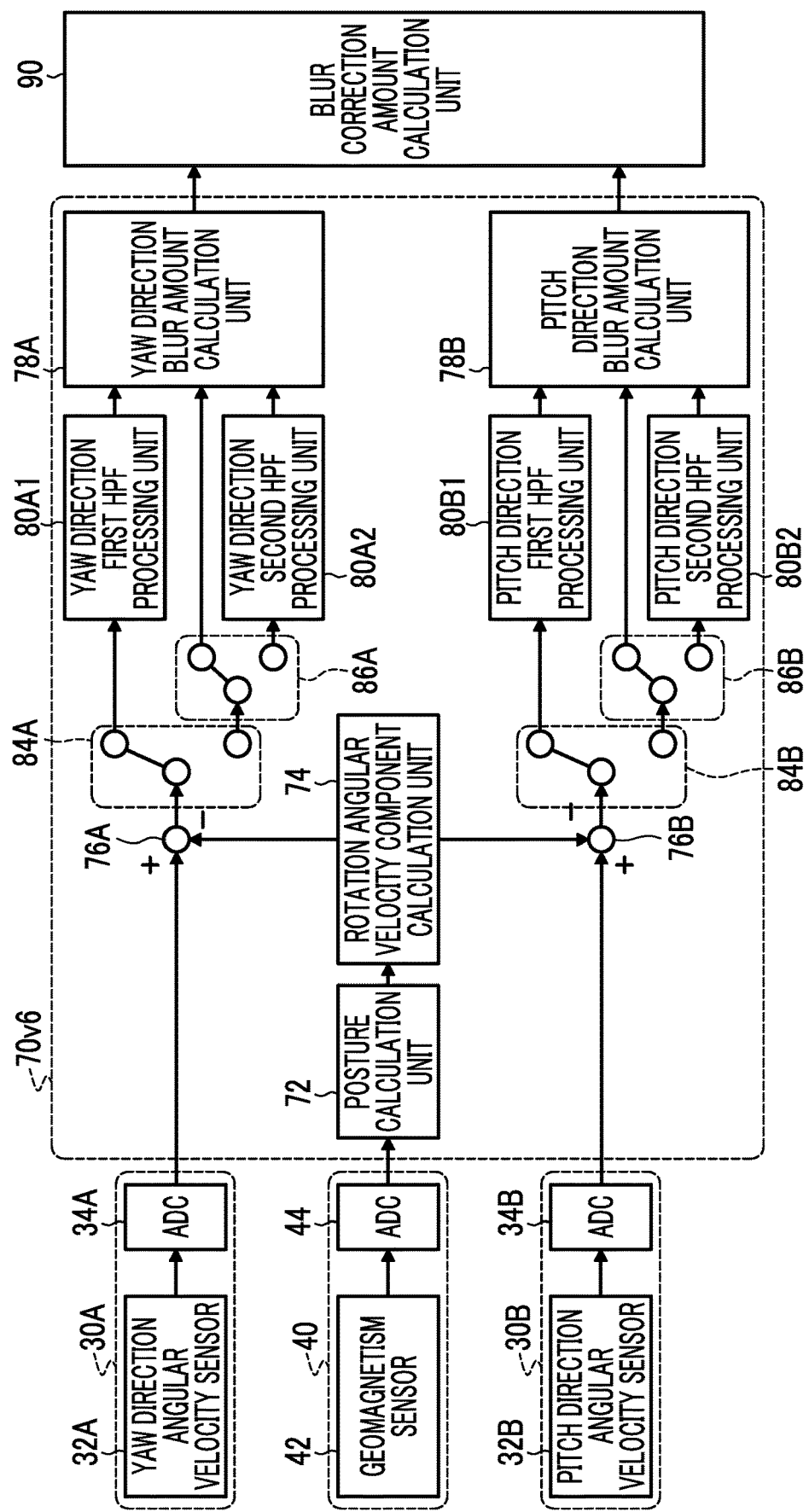
FIG. 16 is a block diagram showing a sixth modification example of the blur detection unit.

FIG. 16 is a block diagram showing a sixth modification example of the blur detection unit.

A blur detection unit 70v6 of the present example is different from the blur detection unit 70v5 of the fifth modification example in that a yaw-direction-subtraction-unit output automatic switch unit 86A and a pitch-direction-subtraction-unit output automatic switch unit 86B that automatically switch the output destinations of the yaw direction subtraction unit 76A and the pitch direction subtraction unit 76B are further provided.

In a case where the output destinations of the yaw direction subtraction unit 76A and the pitch direction subtraction unit 76B are set to the yaw direction second HPF processing unit 80A2 and the pitch direction second HPF processing unit 80B2 by the yaw-direction-subtraction-unit output destination setting unit 84A and the pitch-direction-subtraction-unit output destination setting unit 84B, the yaw direction subtraction unit output automatic switch unit 86A and the pitch-direction-subtraction-unit output automatic switch unit 86B automatically switch the output destinations of the yaw direction subtraction unit 76A and the pitch direction subtraction unit 76B to the yaw direction blur amount calculation unit 78A and the pitch direction blur amount calculation unit 78B under a predetermined condition. Specifically, it is determined whether or not the outputs of the yaw direction subtraction unit 76A and the pitch direction subtraction unit 76B are equal to or less than the threshold value, and the output destinations of the yaw direction subtraction unit 76A and the pitch direction subtraction unit 76B are switched to the yaw direction blur amount calculation unit 78A and the pitch direction blur amount calculation unit 78B in a case where the outputs are equal to or less than the threshold value. Accordingly, it is possible to appropriately detect the blur amount depending on a state of the angular velocity sensor. That is, a case where the outputs of the yaw direction subtraction unit 76A and the pitch direction subtraction unit 76B are equal to or less than the threshold value is a case where the zero variation is deemed not to be present or to be negligibly small. Accordingly, in this case, the output destinations of the yaw direction subtraction unit 76A and the pitch direction subtraction unit 76B are set to the yaw direction blur amount calculation unit 78A and the pitch direction blur amount calculation unit 78B. Accordingly, it is possible to appropriately detect the blurring at a lower frequency. Meanwhile, a case where the outputs of the yaw direction subtraction unit 76A and the pitch direction subtraction unit 76B exceed the threshold value is a case where the zero variation is large. Accordingly, in this case, the output destinations of the yaw direction subtraction unit 76A and the pitch direction subtraction unit 76B are set to the yaw direction second HPF processing unit 80A2 and the pitch direction second HPF processing unit 80B2 as set above. As a result, it is possible to appropriately detect the blurring by eliminating the influence of the zero point fluctuation.

Modification Example of Blur Correction Mechanism

Although it has been described in the aforementioned embodiment that the blurring is corrected by moving the correction lens, the configuration of the blur correction mechanism is not limited thereto. For example, a known blur correction mechanism such as a blur correction mechanism using a variable-angle prism may be used.

Second Embodiment

[Configuration]

Figure 17:
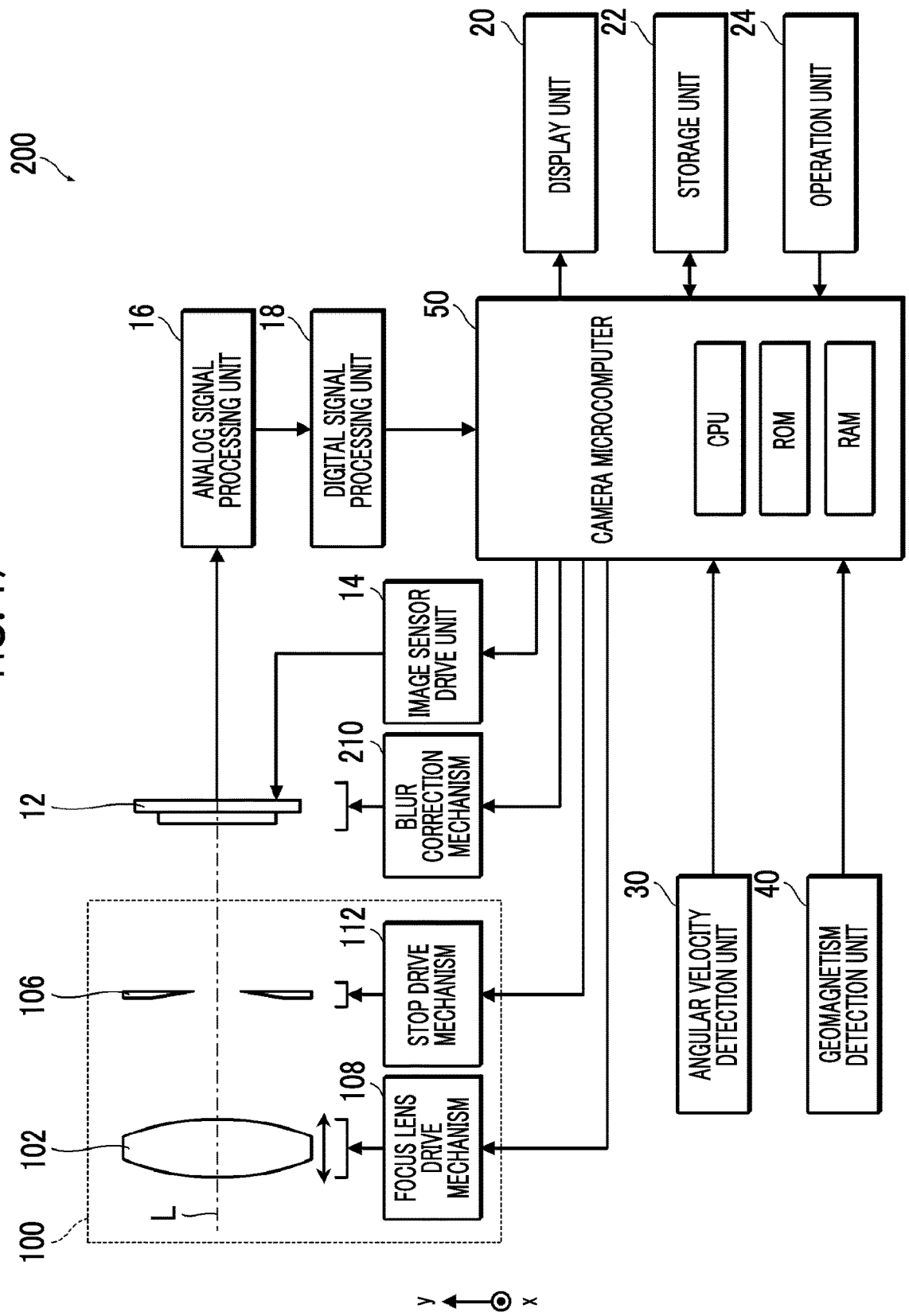
FIG. 17 is a block diagram showing a schematic configuration of a second embodiment of the digital camera

FIG. 17 is a block diagram showing a schematic configuration of a second embodiment of the digital camera.

As shown in this drawing, a digital camera 200 of the present embodiment corrects the blurring by moving the image sensor 12 (so-called image sensor shift method).

Configurations other than the blur correction mechanism are substantially the same as those of the digital camera 10 of the first embodiment. Accordingly, only a configuration of a blur correction mechanism 210 for correcting the blurring will be described.

Figure 18:
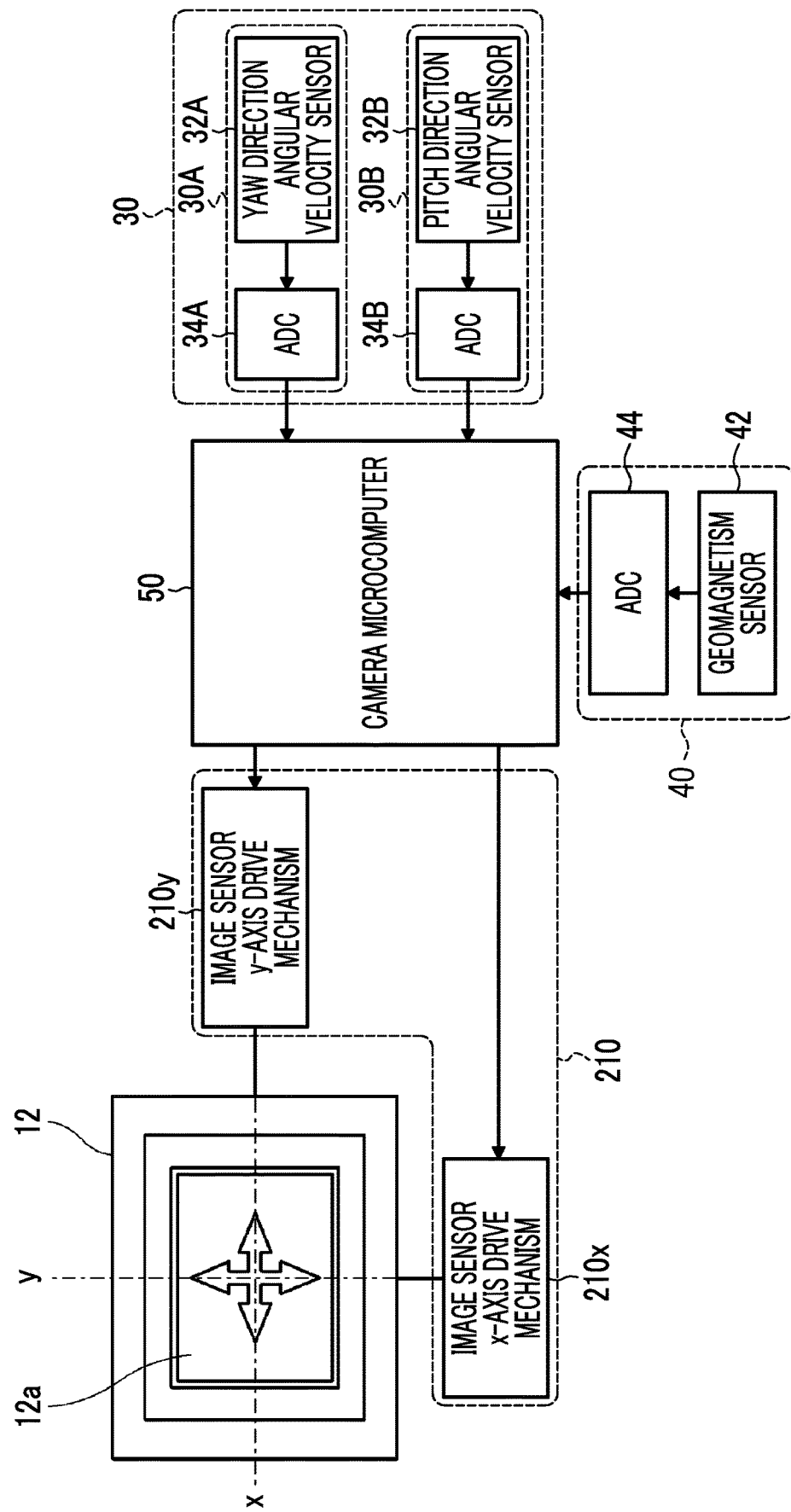
FIG. 18 is a diagram showing a schematic configuration of the blur correction mechanism.

FIG. 18 is a diagram showing a schematic configuration of the blur correction mechanism.

The blur correction mechanism 210 comprises an image sensor x-axis drive mechanism 210x and an image sensor y-axis drive mechanism 210y.

The image sensor x-axis drive mechanism 210x is a mechanism that moves the image sensor 12 in the x-axis direction. The image sensor x-axis drive mechanism 210x comprises a linear motor (for example, voice coil motor) as an actuator and a drive circuit thereof. The image sensor x-axis drive mechanism 210x drives the linear motor according to a command from the camera microcomputer 50, and moves the image sensor 12 in the x-axis direction.

The image sensor y-axis drive mechanism 210y is a mechanism that moves the image sensor 12 in the y-axis direction. The image sensor y-axis drive mechanism 210y comprises a linear motor (for example, voice coil motor) as an actuator and a drive circuit thereof. The image sensor y-axis drive mechanism 210y drives the linear motor according to a command from the camera microcomputer 50, and moves the image sensor 12 in the y-axis direction.

Since the digital camera 200 of the present embodiment corrects the blurring by moving the image sensor 12, the blur correction lens 104 and the blur correction mechanism 110 are not included in the imaging optical system 100.

[Action]

The blurring is corrected in the same procedure as that of the digital camera 10 of the first embodiment except that the blurring is corrected by moving the image sensor 12.

Initially, an angular velocity of the digital camera 200 is detected. Subsequently, a posture of the digital camera 200 with respect to the Earth's rotation axis is detected. Subsequently, the Earth's rotation angular velocity component superimposed on the detection result of the angular velocity is calculated based on the detected posture. Subsequently, the Earth's rotation angular velocity component is subtracted from the detection result of the angular velocity. Accordingly, an angular velocity of a true shake acting on the digital camera 200 is acquired. Subsequently, the blur amount is calculated from the angular velocity after the subtraction processing. Subsequently, the blur correction amount is calculated based on the calculated blur amount. Subsequently, the blur correction mechanism 210 is driven based on the calculated blur correction amount. Accordingly, the image sensor 12 is moved in a direction in which the blurring is canceled, and the blurring is corrected.

Third Embodiment

[Configuration]

Figure 19:
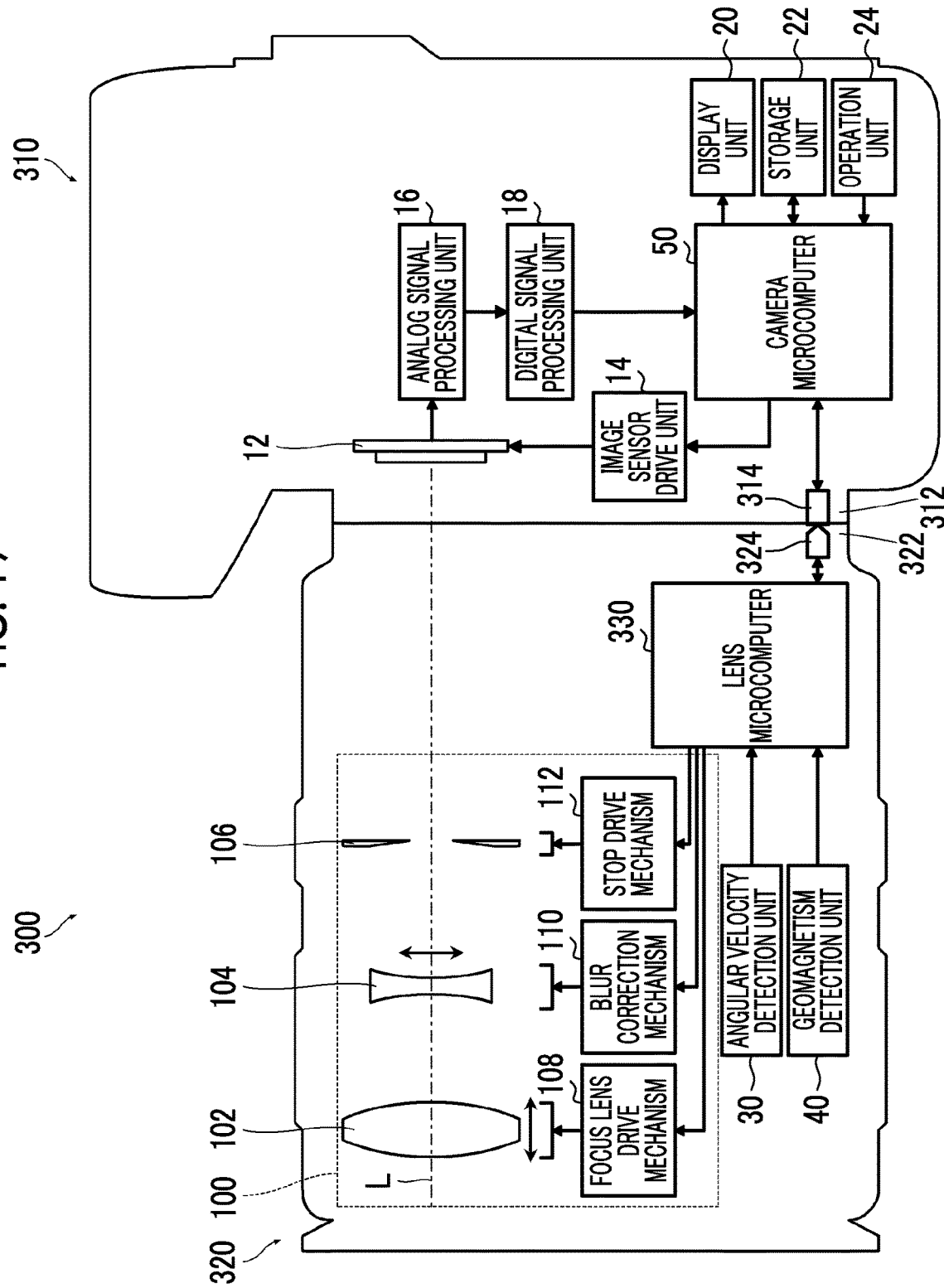
FIG. 19 is a block diagram showing a schematic configuration of a third embodiment of the digital camera.

FIG. 19 is a block diagram showing a schematic configuration of a third embodiment of the digital camera.

A digital camera 300 of the present embodiment is a digital camera with an interchangeable lens, and comprises a camera body 310 and an interchangeable lens 320. The camera body 310 is an example of an imaging device main body, and the interchangeable lens 320 is an example of a lens device. The interchangeable lens 320 is attachable and detachable to and from the camera body 310 through a mount.

The mount includes a body-side mount 312 provided at the camera body 310 and a lens-side mount 322 provided at the interchangeable lens 320. A body-side contact point 314 is provided at the body-side mount 312, and a lens-side contact point 324 is provided at the lens-side mount 322. In a case where the interchangeable lens 320 is attached to the camera body 310 through the mount, the lens-side contact point 324 is connected to the body-side contact point 314. Accordingly, the camera body 310 and the interchangeable lens 320 are electrically connected and are connected so as to communicate with each other.

In the digital camera 300 of the present embodiment, the interchangeable lens 320 has a blur detection mechanism and a blur correction function. Thus, in the digital camera 300 of the present embodiment, the interchangeable lens 320 comprises an imaging optical system 100, an angular velocity detection unit 30, a geomagnetism detection unit 40, and a lens microcomputer 330.

Meanwhile, the camera body 310 comprises an image sensor 12, an image sensor drive unit 14, an analog signal processing unit 16, a digital signal processing unit 18, a display unit 20, a storage unit 22, an operation unit 24, and a camera microcomputer 50.

Figure 20:
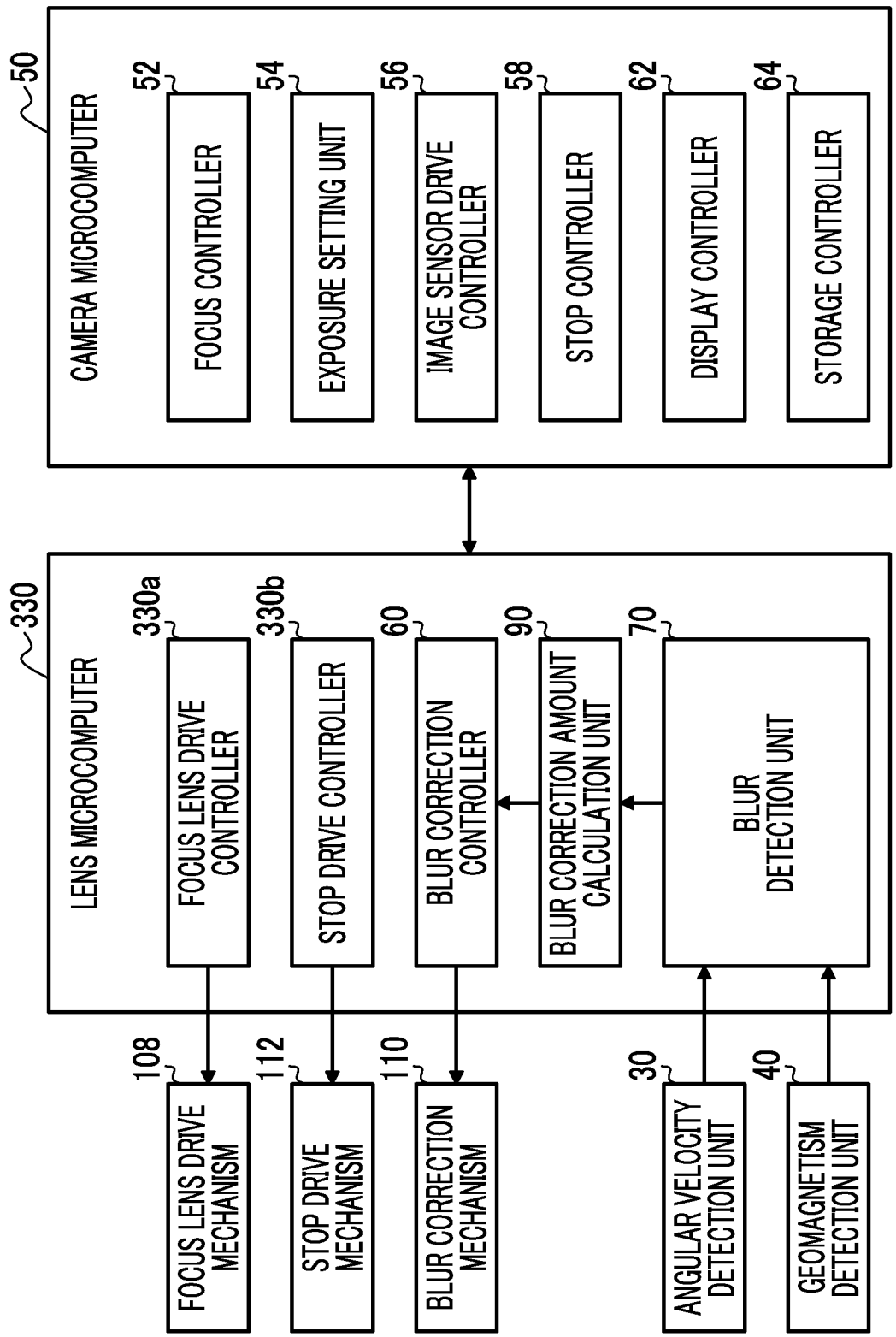
FIG. 20 is a block diagram of main functions realized by a lens microcomputer and a camera microcomputer.

FIG. 20 is a block diagram of main functions realized by the lens microcomputer and the camera microcomputer.

The lens microcomputer 330 is a computer (microcomputer) comprising a CPU, a RAM, and a ROM. The lens microcomputer 330 functions as a blur correction controller 60, a blur detection unit 70, a blur correction amount calculation unit 90, a focus lens drive controller 330a, and a stop drive controller 330b by executing predetermined programs. The programs executed by the lens microcomputer 330 and various data necessary for control are stored in the ROM.

The blur detection unit 70 detects the blur amount of the digital camera 300 by attaching the interchangeable lens 320 to the camera body 310. The blur detection unit 70, the angular velocity detection unit 30, and the posture detection unit constitute a blur detection device.

The blur correction amount calculation unit 90 calculates the blur correction amount based on the blur amount detected by the blur detection unit 70.

The blur correction controller 60 corrects the blurring by controlling the driving of the blur correction mechanism 110 based on the correction amount calculated by the blur correction amount calculation unit 90.

The focus lens drive controller 330a controls the driving of the focus lens drive mechanism 108 according to a command from the camera microcomputer 50.

The stop drive controller 330b controls the driving of the stop drive mechanism 112 according to a command from the camera microcomputer 50.

As stated above, in the digital camera 300 of the present embodiment, the interchangeable lens 320 has a blur detection mechanism and a blur correction function.

[Action]

A procedure of the blur correction is the same as that of the digital camera 10 of the first embodiment.

Initially, an angular velocity of the digital camera 300 is detected. Subsequently, a posture of the digital camera 300 with respect to the Earth's rotation axis is detected. Subsequently, the Earth's rotation angular velocity component superimposed on the detection result of the angular velocity is calculated based on the detected posture. Subsequently, the Earth's rotation angular velocity component is subtracted from the detection result of the angular velocity. Accordingly, an angular velocity of a true shake acting on the digital camera 300 is acquired. Subsequently, the blur amount is calculated from the angular velocity after the subtraction processing. Subsequently, the blur correction amount is calculated based on the calculated blur amount. Subsequently, the blur correction mechanism 110 is driven based on the calculated blur correction amount. Accordingly, the blurring is corrected.

As stated above, in accordance with the digital camera 300 of the present embodiment, it is possible to detect and correct the blurring in the interchangeable lens 320.

Although it has been described in the present embodiment that the interchangeable lens 320 has the blur detection function, the camera body 310 may have the blur detection function.

Although it has been described in the present embodiment that the interchangeable lens 320 comprises both the angular velocity detection unit 30 and the geomagnetism detection unit 40, the camera body 310 may comprise these units. The camera body 310 may comprise any one of these units, and the interchangeable lens 320 may comprise the other one thereof.

Fourth Embodiment

[Configuration]

Figure 21:
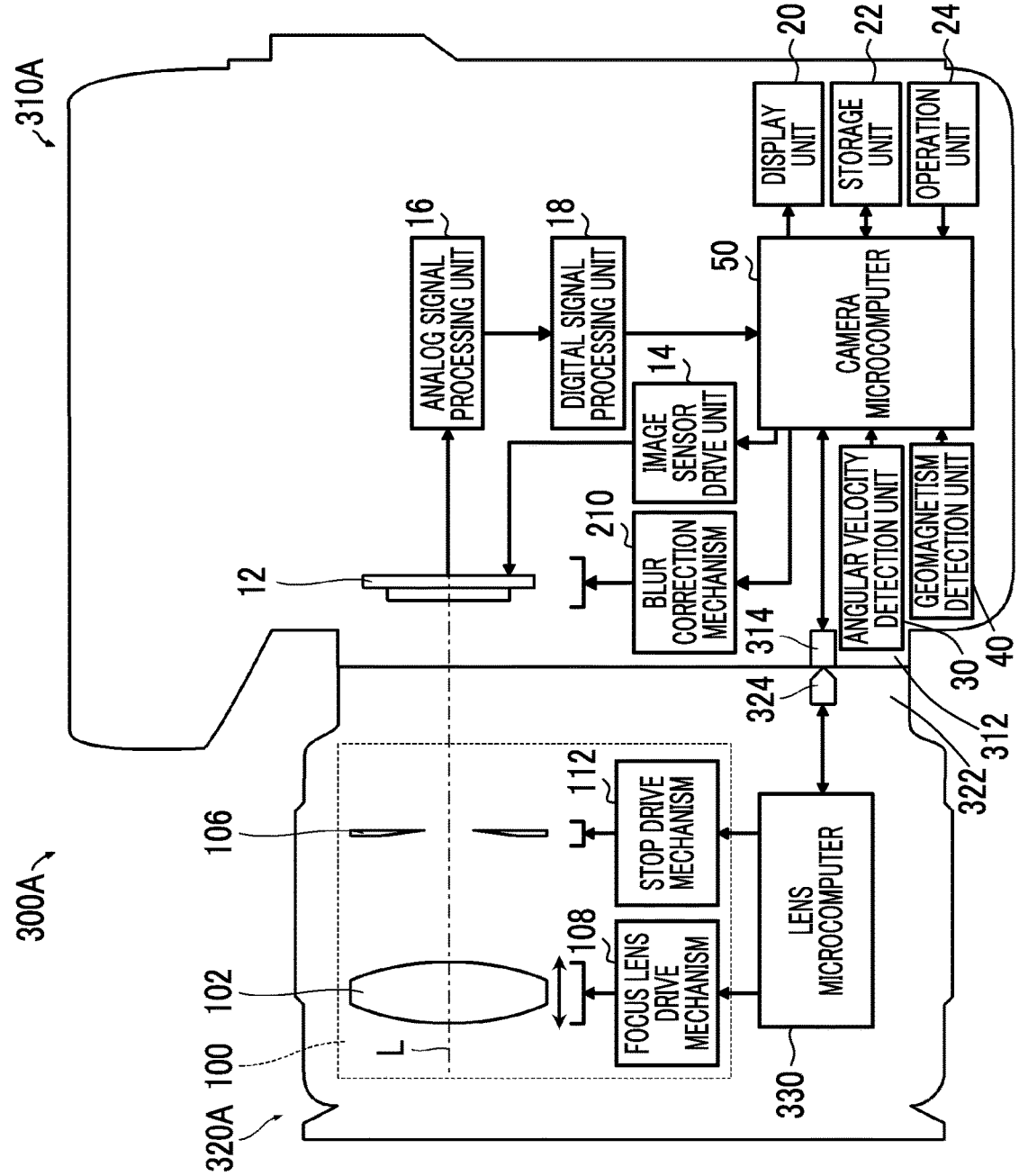
FIG. 21 is a block diagram showing a schematic configuration of a fourth embodiment of the digital camera.

FIG. 21 is a block diagram showing a schematic configuration of a fourth embodiment of the digital camera.

A digital camera 300A of the present embodiment is also the digital camera with the interchangeable lens, and comprises a camera body 310A and an interchangeable lens 320A. The digital camera 300A of the present embodiment is different from the digital camera 300 of the third embodiment in that the camera body 310A has the blur detection and correction functions.

As shown in FIG. 21, the camera body 310A comprises an angular velocity detection unit 30, a geomagnetism detection unit 40, and a blur correction mechanism 210 in addition to an image sensor 12, an image sensor drive unit 14, an analog signal processing unit 16, a digital signal processing unit 18, a display unit 20, a storage unit 22, an operation unit 24, and a camera microcomputer 50. The blur correction mechanism 210 corrects the blurring by moving the image sensor 12.

The interchangeable lens 320A comprises an imaging optical system 100 and a lens microcomputer 330.

Figure 22:
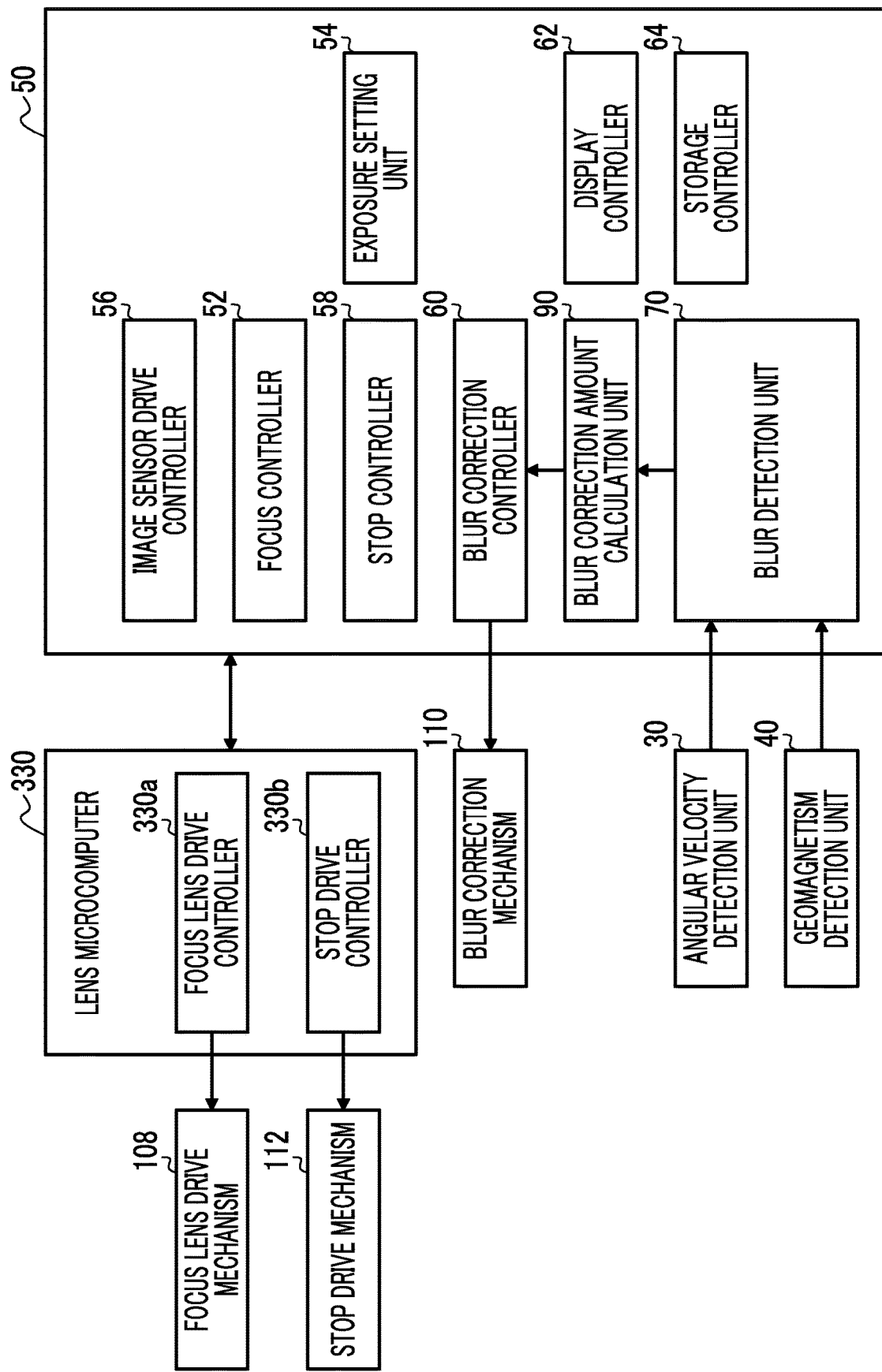
FIG. 22 is a block diagram of main functions realized by a lens microcomputer and a camera microcomputer.

FIG. 22 is a block diagram of main functions realized by the lens microcomputer and the camera microcomputer.

The camera microcomputer 50 functions as a blur correction controller 60, a blur detection unit 70, and a blur correction amount calculation unit 90 in addition to functioning as a focus controller 52, an exposure setting unit 54, an image sensor drive controller 56, a stop controller 58, a display controller 62, and a storage controller 64 by executing predetermined programs.

The blur detection unit 70 detects the blur amount of the digital camera 300A. The blur detection unit 70, the angular velocity detection unit 30, and the posture detection unit constitute a blur detection device.

The blur correction amount calculation unit 90 calculates the blur correction amount based on the blur amount detected by the blur detection unit 70.

The blur correction controller 60 corrects the blurring by controlling the driving of the blur correction mechanism 210 based on the correction amount calculated by the blur correction amount calculation unit 90.

The lens microcomputer 330 functions as a focus lens drive controller 330a and a stop drive controller 330b by executing predetermined programs.

As stated above, in the digital camera 300 of the present embodiment, the camera body 310A has a blur detection mechanism and a blur correction function.

Action

A procedure of the blur correction is the same as that of the digital camera 10 of the first embodiment.

Initially, an angular velocity of the digital camera 300A is detected. Subsequently, a posture of the digital camera 300A with respect to the Earth's rotation axis is detected. Subsequently, the Earth's rotation angular velocity component superimposed on the detection result of the angular velocity is calculated based on the detected posture. Subsequently, the Earth's rotation angular velocity component is subtracted from the detection result of the angular velocity. Accordingly, an angular velocity of a true shake acting on the digital camera 300A is acquired. Subsequently, the blur amount is calculated from the angular velocity after the subtraction processing. Subsequently, the blur correction amount is calculated based on the calculated blur amount. Subsequently, the blur correction mechanism 210 is driven based on the calculated blur correction amount. Accordingly, the blurring is corrected.

Although it has been described in the present embodiment that the camera body 310A has the blur detection function, the interchangeable lens 320A may have the blur detection function.

Although it has been described in the present embodiment that the camera body 310A comprises both the angular velocity detection unit 30 and the geomagnetism detection unit 40, the interchangeable lens 320A may comprise these units. The camera body 310 may comprise any one of these units, and the interchangeable lens 320 may comprise the other one thereof.

Other Embodiments

Although it has been described in the aforementioned embodiments, the functions of the blur detection unit and the blur correction amount calculation unit are realized by the computer, hardware configurations for realizing the functions of the blur detection unit and the blur correction amount calculation unit are limited to thereto. The functions thereof may be realized by various processors. The various processors include a CPU which is a general-purpose processor functioning as a processing unit that perform various processing by executing software (programs), a programmable logic device (PLD) which is a processor capable of changing a circuit configuration after a field programmable gate array (FPGA) is manufactured, and a dedicated electrical circuit which is a processor having a circuit configuration designed as a dedicated circuit in order to perform specific processing such as an application specific integrated circuit (ASIC).

One processing unit may be one of these various processors, or may be the same kind or different kinds of two or more processors. For example, one processing unit may be constituted by a plurality of FPGAs, or may be constituted by combining a CPU and an FPGA.

A plurality of processing unit may be constituted by one processor. As an example in which the plurality of processing units is constituted by one processor, a first example is that one processor is constituted by combining one or more CPUs and software and one processor may function as the plurality of processing units as represented by a computer such as a server. A second example is that a processor that realizes the functions of the entire system including the plurality of processing units by using one integrated circuit (IC) chip as represented by a system on chip (SoC). As stated above, various processing units are constituted by using one or more various processors described above as a hardware structure.

More specifically, the hardware structure of these various processors is an electrical circuit acquired by combining circuit elements such as semiconductor elements.

EXPLANATION OF REFERENCES

10: digital camera
12: image sensor
14: image sensor drive unit
16: analog signal processing unit
18: digital signal processing unit
20: display unit
22: storage unit 24: operation unit
30: angular velocity detection unit
30A: yaw direction angular velocity detection unit
30B: pitch direction angular velocity detection unit
32A: yaw direction angular velocity sensor
32B: pitch direction angular velocity sensor
34A: ADC (AD converter)
34B: ADC (AD converter)
40: geomagnetism detection unit
42: geomagnetism sensor
44: ADC (AD converter)
50: camera microcomputer
52: focus controller
54: exposure setting unit
56: image sensor drive controller
58: stop controller
60: blur correction controller
62: display controller
64: storage controller
70: blur detection unit
70$v$1: blur detection unit
70$v$2: blur detection unit
70$v$3: blur detection unit
70$v$4: blur detection unit
70$v$5: blur detection unit
70$v$6: blur detection unit
72: posture calculation unit
74: rotation angular velocity component calculation unit
76A: yaw direction subtraction unit
76B: pitch direction subtraction unit
78A: yaw direction blur amount calculation unit
78B: pitch direction blur amount calculation unit
80A: yaw direction HPF processing unit
80A1: yaw direction first HPF processing unit (yaw direction first high pass filter processing unit)
80A2: yaw direction second HPF processing unit (yaw direction second high pass filter processing unit)
80B: pitch direction HPF processing unit
80B1: pitch direction first HPF processing unit (pitch direction first high filter processing unit)
80B2: pitch direction second HPF processing unit (pitch direction second high filter processing unit)
82A: yaw-direction-subtraction-unit output destination switch unit
82B: pitch-direction-subtraction-unit output destination switch unit
84A: yaw-direction-subtraction-unit output destination setting unit
84B: pitch-direction-subtraction-unit output destination setting unit
86A: yaw-direction-subtraction-unit output automatic switch unit
86B: pitch-direction-subtraction-unit output automatic switch unit
90: blur correction amount calculation unit
100: imaging optical system
102: focus lens
104: blur correction lens
106: stop
108: focus lens drive mechanism
110: blur correction mechanism
110$x$: blur correction lens x-axis drive mechanism
110$y$: blur correction lens y-axis drive mechanism
112: stop drive mechanism
200: digital camera
210: blur correction mechanism
210$x$: image sensor x-axis drive mechanism
210$y$: image sensor y-axis drive mechanism
300: digital camera
300A: digital camera
310: camera body
310A: camera body
312: body-side mount
314: body-side contact point
320: interchangeable lens
320A: interchangeable lens
322: lens-side mount
324: lens-side contact point
330: lens microcomputer
330$a$: focus lens drive controller
330$b$: stop drive controller
L: optical axis
Pit: pitch direction
Yaw: yaw direction
S1 to S7: procedure of blur correction including blur detection
S11 to S18: procedure of blur correction including blur detection
S21 to S29: procedure of blur correction including blur detection
S31 to S40: procedure of blur correction including blur detection
S41 to S51: procedure of blur correction including blur detection

What is claimed is:

1. A blur detection device comprising:
an angular velocity detector that detects an angular velocity of an imaging device;
a posture detector that detects a posture of the imaging device with respect to an Earth's rotation axis;
a rotation angular velocity component calculator that calculates an Earth's rotation angular velocity component superimposed on an output of the angular velocity detector based on the posture of the imaging device detected by the posture detector;
a subtractor that subtracts the rotation angular velocity component calculated by the rotation angular velocity component calculator from the output of the angular velocity detector;
a blur amount calculator that calculates a blur amount of the imaging device based on an output of the subtractor; and
a high pass filter that performs high pass filter processing on the output of the subtractor, a cutoff frequency of the high pass filter being set to be a value lower than a frequency of blurring caused by Earth's rotation.

2. The blur detection device according to claim 1, further comprising:
a switcher that switches an output destination of the subtractor,
wherein the switcher determines whether or not the output of the subtractor is equal to or less than a subtractor output threshold value, sets the output destination of the subtractor to the blur amount calculator in a case where the output of the subtractor is equal to or less than the subtractor output threshold value, and sets the output destination of the subtractor to the high pass filter in a case where the output of the subtractor exceeds the subtractor output threshold value.

3. A blur detection device comprising:
an angular velocity detector that detects an angular velocity of an imaging device;
a posture detector that detects a posture of the imaging device with respect to an Earth's rotation axis;

a rotation angular velocity component calculator that calculates an Earth's rotation angular velocity component superimposed on an output of the angular velocity detector based on the posture of the imaging device detected by the posture detector;

a subtractor that subtracts the rotation angular velocity component calculated by the rotation angular velocity component calculator from the output of the angular velocity detector;

a blur amount calculator that calculates a blur amount of the imaging device based on an output of the subtractor;

a first high pass filter that performs high pass filter processing on the output of the subtractor, a cutoff frequency of the first high pass filter being set to be a value higher than a frequency of blurring caused by Earth's rotation;

a second high pass filter that performs high pass filter processing on the output of the subtractor, a cutoff frequency of the second high pass filter being set to be a value lower than the frequency of the blurring caused by the Earth's rotation; and a switcher that switches an output destination of the subtractor to the first high pass filter or the second high pass filter based on an imaging condition.

4. The blur detection device according to claim 3, wherein the switcher determines whether or not an exposure time is equal to or less than an exposure time threshold value, sets the output destination of the subtractor to the first high pass filter in a case where the exposure time is equal to or less than the exposure time threshold value, and sets the output destination of the subtractor to the second high pass filter in a case where the exposure time exceeds the exposure time threshold value.

5. The blur detection device according to claim 4, wherein, in the case where the exposure time exceeds the exposure time threshold value, the switcher further determines whether or not the output of the subtractor is equal to or less than a subtractor output threshold value, sets the output destination of the subtractor to the blur amount calculator in a case where the output of the subtractor is equal to or less than the subtractor output threshold value, and sets the output destination of the subtractor to the second high pass filter in a case where the output of the subtractor exceeds the subtractor output threshold value.

6. The blur detection device according to claim 4, wherein, in a case where a time required for detecting blurring for a pixel pitch due to the Earth's rotation is a limit exposure time, the limit exposure time is set as the exposure time threshold value.

7. The blur detection device according to claim 3, wherein the switcher determines whether or not a mode in which long-time exposure is performed is selected as an imaging mode, sets the output destination of the subtractor to the first high pass filter in a case where the mode in which the long-time exposure is performed is not selected, and sets the output destination of the subtractor to the second high pass filter in a case where the mode in which the long-time exposure is performed is selected.

8. The blur detection device according to claim 7, wherein, in the case where the mode in which the long-time exposure is performed is selected, the switcher further determines whether or not the output of the subtractor is equal to or less than a subtractor output threshold value, sets the output destination of the subtractor to the blur amount calculator in a case where the output of the subtractor is equal to or less than the subtractor output threshold value, and sets the output destination of the subtractor to the second high pass filter in a case where the output of the subtractor exceeds the subtractor output threshold value.

9. A blur detection device comprising:

an angular velocity detector that detects an angular velocity of an imaging device;

a posture detector that detects a posture of the imaging device with respect to an Earth's rotation axis;

a rotation angular velocity component calculator that calculates an Earth's rotation angular velocity component superimposed on an output of the angular velocity detector based on the posture of the imaging device detected by the posture detector;

a subtractor that subtracts the rotation angular velocity component calculated by the rotation angular velocity component calculator from the output of the angular velocity detector;

a blur amount calculator that calculates a blur amount of the imaging device based on an output of the subtractor;

a first high pass filter that performs high pass filter processing on the output of the subtractor, a cutoff frequency of the first high pass filter being set to be a value higher than a frequency of blurring caused by Earth's rotation;

a second high pass filter that performs high pass filter processing on the output of the subtractor, a cutoff frequency of the second high pass filter being set to be a value lower than the frequency of the blurring caused by the Earth's rotation; and a setter that sets an output destination of the subtractor to the first high pass filter or the second high pass filter.

10. The blur detection device according to claim 9, further comprising:

an automatic switcher that determines whether or not the output of the subtractor is equal to or less than a subtractor output threshold value in a case where the output destination of the subtractor is set to the second high pass filter, and switches the output destination of the subtractor to the blur amount calculator in a case where the output of the subtractor is equal to or less than the subtractor output threshold value.

11. An imaging device comprising:

an imaging optical system comprising a blur correction lens, and a blur corrector that corrects blurring by moving the blur correction lens;

an image sensor that receives light passing through the imaging optical system to capture an image;

the blur detection device according to claim 1;

a blur correction amount calculator that calculates a blur correction amount based on a blur amount detected by the blur detection device; and a blur correction controller that controls driving of the blur corrector based on the correction amount calculated by the blur correction amount calculator.

12. An imaging device comprising:

an imaging optical system;

an image sensor that receives light passing through the imaging optical system to capture an image;

a blur corrector that corrects blurring by moving the image sensor;

the blur detection device according to claim 1;

a blur correction amount calculator that calculates a blur correction amount based on a blur amount detected by the blur detection device; and a blur correction controller that controls driving of the blur corrector based on the correction amount calculated by the blur correction amount calculator.

13. A lens device attachable and detachable to and from an imaging device main body, the lens device comprising: the blur detection device according to claim 1.

14. The lens device according to claim 13, further comprising:

a blur correction lens;

a blur corrector that corrects blurring by moving the blur correction lens;

a blur correction amount calculator that calculates a blur correction amount based on a blur amount detected by the blur detection device; and a blur correction controller that controls driving of the blur corrector based on the correction amount calculated by the blur correction amount calculator.

15. An imaging device main body to and from which a lens device is attachable and detachable, the imaging device main body comprising:

an image sensor that receives light passing through the lens device to capture an image; and the blur detection device according to claim 1.

16. The imaging device main body according to claim 15, further comprising:

a blur corrector that corrects blurring by moving the image sensor;

a blur correction amount calculator that calculates a blur correction amount based on a blur amount detected by the blur detection device; and a blur correction controller that controls driving of the blur corrector based on the correction amount calculated by the blur correction amount calculator.

17. A blur detection method comprising:

a step of detecting an angular velocity of an imaging device;

a step of detecting a posture of the imaging device with respect to an Earth's rotation axis;

a step of calculating an Earth's rotation angular velocity component superimposed on a detection result of the angular velocity of the imaging device based on the detected posture of the imaging device;

a step of subtracting the calculated rotation angular velocity component from the detection result of the angular velocity of the imaging device;

a step of calculating a blur amount of the imaging device based on the subtracted detection result of the angular velocity of the imaging device; and a step of performing high pass filter processing on the subtracted detection result of the angular velocity of the imaging device, a cutoff frequency of the high pass filter processing being set to be a value lower than a frequency of blurring caused by Earth's rotation.

18. A non-transitory computer-readable recording medium causing a computer to execute:

in a case where a command stored in the non-transitory computer-readable recording medium is read by the computer, a function of receiving an output from an angular velocity detector that detects an angular velocity of an imaging device;

a function of receiving an output of a posture detector that detects a posture of the imaging device with respect to an Earth's rotation axis;

a function of calculating an Earth's rotation angular velocity component superimposed on an output of the angular velocity detector based on the posture of the imaging device detected by the posture detector;

a function of subtracting the calculated rotation angular velocity component from the output of the angular velocity detector;

a function of calculating a blur amount of the imaging device based on the subtracted output of the angular velocity detector; and a function of performing high pass filter processing on the subtracted output of the angular velocity detector, a cutoff frequency of the high pass filter processing being set to be a value lower than a frequency of blurring caused by Earth's rotation.

* * * * *